US012594555B2

(12) United States Patent
Lee et al.

(10) Patent No.: US 12,594,555 B2
(45) Date of Patent: Apr. 7, 2026

(54) MICROFLUIDIC CHIPS, MICROFLUIDIC PROCESSING SYSTEMS, AND MICROFLUIDIC PROCESSING METHODS WITH MAGNETIC FIELD CONTROL MECHANISM

(71) Applicant: National Yang Ming Chiao Tung University, Hsinchu City (TW)

(72) Inventors: Chen-Yi Lee, Hsinchu City (TW); Yun-Sheng Chan, Hualien City (TW)

(73) Assignee: National Yang Ming Chiao Tung University, Hsinchu City (TW)

( * ) Notice: Subject to any disclaimer, the term of this patent is extended or adjusted under 35 U.S.C. 154(b) by 639 days.

(21) Appl. No.: 18/184,406

(22) Filed: Mar. 15, 2023

(65) Prior Publication Data

US 2023/0356219 A1 Nov. 9, 2023

Related U.S. Application Data

(60) Provisional application No. 63/338,185, filed on May 4, 2022.

(51) Int. Cl.
*B01L 3/00* (2006.01)

(52) U.S. Cl.
CPC ... *B01L 3/502715* (2013.01); *B01L 3/502792* (2013.01); *B01L 2300/0645* (2013.01); *B01L 2300/0816* (2013.01); *B01L 2300/0819* (2013.01); *B01L 2300/18* (2013.01)

(58) Field of Classification Search
CPC ......... B01L 3/502715; B01L 3/502792; B01L 2300/18; B01L 2300/1827; B01L 2300/0816; B01L 2300/0819; B01L 2400/0427; B01L 2400/043
See application file for complete search history.

(56) References Cited

U.S. PATENT DOCUMENTS

2015/0174574 A1 6/2015 Chang

OTHER PUBLICATIONS

Extended European Search Report from corresponding European application No. 23167718.8, Oct. 25, 2023, 9 pages.

*Primary Examiner* — Lessanework Seifu
(74) *Attorney, Agent, or Firm* — Christensen, Fonder, Dardi & Herbert PLLC; John P. Fonder

(57) ABSTRACT

Microfluidic chips, microfluidic processing systems, and microfluidic processing methods are provided. A microfluidic chip includes a top plate and a microelectrode dot array arranged under the top plate. The microelectrode dot array includes microelectrode devices connected in a series. Each microelectrode device includes a microfluidic electrode under the top plate, a multi-functional electrode under the microfluidic electrode, and a control circuit under the multi-functional electrode. Each control circuit includes a first storage circuit, a second storage circuit, a microfluidic control and location-sensing circuit, and a temperature and magnetic control circuit. Each first storage circuit reads in a sample operation configuration. Each second storage circuit reads in a magnetic field control configuration. Each microfluidic control and location-sensing circuit enters a sample control status corresponding to a sample operation configuration. Each temperature and magnetic control circuit enters a magnetic control status corresponding to a magnetic field control configuration.

20 Claims, 19 Drawing Sheets

MICROFLUIDIC CHIPS, MICROFLUIDIC PROCESSING SYSTEMS, AND MICROFLUIDIC PROCESSING METHODS WITH MAGNETIC FIELD CONTROL MECHANISM

PRIORITY

This application claims priority to U.S. Provisional Patent Application No. 63/338,185 filed on May 4, 2022, which is hereby incorporated by reference in its entirety.

FIELD OF THE INVENTION

The present invention relates to microfluidic chips, microfluidic processing systems, and microfluidic processing methods. More specifically, the present invention relates to microfluidic chips, microfluidic processing systems, and microfluidic processing methods with magnetic field control mechanisms.

BACKGROUND OF THE INVENTION

Compared to conventional biomedical equipment, adopting digital microfluidic biochips (DMFBs) in biomedical tests (e.g., protein analyses, disease diagnoses) offers several advantages, including equipment miniaturization, reaction volume reduction, low sample and reagent consumption, low cost, and clinical laboratory automation. Specifically, DMFBs with electrode arrays are powerful analysis platforms for biomedical tests, such as nucleic acid-based testing and drug-screening applications.

Conventional DMFBs typically use the electrowetting-on-dielectric (EWOD) technique to perform the microfluidic process and provide an opportunity for clinical laboratory automation. Nevertheless, as the electrodes on conventional DMFBs are arranged in specific patterns for target-specific biomedical tests, they cannot be used for other biomedical tests once they have been designed. Consequently, digital microfluidic test equipment that is adaptive to the various biomedical tests and a microfluidic test technique that provides adaptive control in response to different biomedical tests are still in urgent need.

Furthermore, to derive a more accurate test result of a sample that contains a minute amount of target (e.g., nucleic acid), there is usually a need to extract the target from the sample before performing the biomedical test. A conventional way to extract the target is using magnetic beads to separate the target from others, one example of such method involves the following main steps: (1) mixing an original sample with a lysing buffer in a vessel to break the cells in the original sample so that the desired target is exposed and/or floating, (2) adding magnetic beads (whose surfaces are coated with certain material to capture the desired targets) and certain binding buffer into the vessel so that the desired target is captured by the magnetic beads, (3) applying an external magnetic field to the outer edge of the vessel to attract the magnetic beads (i.e., to make the magnetic beads immobilized) and adding a wash buffer to wash out the undesired portion, (4) adding an elution buffer into the vessel to separate the magnetic beads with desired target(s), and (5) applying an external magnetic field to the outer edge of the vessel to attract the magnetic beads (i.e., to make the magnetic beads immobilized) and taking out the desired targets. Then, the biomedical test is applied to the extracted targets.

Although applying the biomedical test to the extracted target will derive more accurate test results, the aforesaid target extraction is tedious. Furthermore, if target extraction and biomedical test are performed on different equipment, moving the extracted target from one equipment to another may cause the extracted target contaminated. Therefore, a technique that can extract a target more conveniently and perform target extraction and biomedical test on the same equipment is needed.

SUMMARY OF THE INVENTION

An objective of the present invention is to provide a microfluidic chip. The microfluidic chip comprises a top plate and a microelectrode dot array arranged under the top plate. The microelectrode dot array comprises a plurality of microelectrode devices connected in a series. Each of the microelectrode devices comprises a microfluidic electrode arranged under the top plate, a multi-functional electrode arranged under the microfluidic electrode, and a control circuit arranged under the multi-functional electrode. Each of the control circuits comprises a first storage circuit, a second storage circuit, a microfluidic control and location-sensing circuit coupled to the corresponding microfluidic electrode, and a temperature and magnetic control circuit coupled to the corresponding multi-functional electrode. Each of the first storage circuits is configured to read in a sample operation configuration during a sub-time interval of a first time interval according to a first clock signal. Each of the second storage circuits is configured to read in a magnetic field control configuration during a sub-time interval of a second time interval according to a second clock signal. Each of the microfluidic control and location-sensing circuits is configured to enter a sample control status corresponding to the corresponding sample operation configuration during a third time interval according to a sample control signal. Each of the temperature and magnetic control circuits is configured to enter a magnetic control status corresponding to the corresponding magnetic field control configuration during a fourth time interval according to a magnetic field control signal.

In some embodiments, for each of the microelectrode devices, the second storage circuit is further configured to read in a heating control configuration during a sub-time interval of a fifth time interval according to the second clock signal. The temperature and magnetic control circuit is configured to enter a heating control status corresponding to the heating control configuration during a sixth time interval according to a heating control signal.

Another objective of the present invention is to provide a microfluidic processing system. The microfluidic processing system comprises a control apparatus and a microfluidic chip, wherein the microfluidic chip comprises a top plate and a microelectrode dot array arranged under the top plate. The microelectrode dot array comprises a plurality of microelectrode devices connected in a series. Each of the microelectrode devices comprises a microfluidic electrode arranged under the top plate, a multi-functional electrode arranged under the microfluidic electrode, and a control circuit arranged under the multi-functional electrode. Each of the control circuits comprises a first storage circuit, a second storage circuit, a microfluidic control and location-sensing circuit coupled to the corresponding microfluidic electrode, and a temperature and magnetic control circuit coupled to the corresponding multi-functional electrode.

The control apparatus is configured to provide a first clock signal, a second clock signal, a plurality of sample operation configurations, a plurality of magnetic field control configurations, a sample control signal, and a magnetic field control signal. Each of the first storage circuits is configured to read in one of the sample operation configurations during a sub-time interval of a first time interval according to the first clock signal. Each of the second storage circuits is configured to read in one of the magnetic field control configurations during a sub-time interval of a second time interval according to the second clock signal. Each of the microfluidic control and location-sensing circuits is configured to enter a sample control status corresponding to one of the sample operation configurations during a third time interval according to the sample control signal. Each of the temperature and magnetic control circuits is configured to enter a magnetic control status corresponding to one of the magnetic field control configurations during a fourth time interval according to the magnetic field control signal.

In some embodiments, the control apparatus is further configured to provide a plurality of heating control configurations and a heating control signal. Each of the second storage circuits is further configured to read in one of the heating control configurations during a sub-time interval of a fifth time interval according to the second clock signal. Each of the temperature and magnetic control circuits is configured to enter a heating control status corresponding to one of the heating control configurations during a sixth time interval according to the heating control signal.

Another objective of the present invention is to provide a microfluidic processing method for use in a control apparatus of a microfluidic processing system to control a microfluidic chip. The microfluidic chip comprises a top plate and a microelectrode dot array arranged under the top plate, wherein the microelectrode dot array comprises a plurality of microelectrode devices connected in a series. Each of the microelectrode devices comprises a microfluidic electrode arranged under the top plate, a multi-functional electrode arranged under the microfluidic electrode, and a control circuit arranged under the multi-functional electrode. Each of the control circuits comprises a first storage circuit, a second storage circuit, a microfluidic control and location-sensing circuit coupled to the corresponding microfluidic electrode, and a temperature and magnetic control circuit coupled to the corresponding multi-functional electrode. The microfluidic processing method comprises the following steps: (a) providing a first clock signal to the microfluidic chip, (b) providing a second clock signal to the microfluidic chip, (c) providing a plurality of sample operation configurations to the microfluidic chip, (d) providing a plurality of magnetic field control configurations to the microfluidic chip, (e) providing a sample control signal to the microfluidic chip, and (f) providing a magnetic field control signal to the microfluidic chip.

Each of the first storage circuits is configured to read in one of the sample operation configurations during a sub-time interval of a first time interval according to the first clock signal. Each of the second storage circuits is configured to read in one of the magnetic field control configurations during a sub-time interval of a second time interval according to the second clock signal. Each of the microfluidic control and location-sensing circuits is configured to enter a sample control status corresponding to one of the sample operation configurations during a third time interval according to the sample control signal. Each of the temperature and magnetic control circuits is configured to enter a magnetic control status corresponding to one of the magnetic field control configurations during a fourth time interval according to the magnetic field control signal.

In some embodiments, the microfluidic processing method further comprises a step for providing a plurality of heating control configurations to the microfluidic chip and a step for providing a heating control signal to the microfluidic chip. Each of the second storage circuits is further configured to read in one of the heating control configurations during a sub-time interval of a fifth time interval according to the second clock signal. Each of the temperature and magnetic control circuits is configured to enter a heating control status corresponding to one of the heating control configurations during a sixth time interval according to the heating control signal.

The detailed technology and preferred embodiments implemented for the subject invention are described in the following paragraphs accompanying the appended drawings for a person having ordinary skill in the art to appreciate the features of the claimed invention.

DETAILED DESCRIPTION

In the following descriptions, the microfluidic chips, microfluidic processing systems, and microfluidic processing methods with the magnetic field control mechanism of the present invention will be explained regarding certain embodiments thereof. However, these embodiments are not intended to limit the present invention to any specific environment, application, or implementation described in these embodiments. Therefore, descriptions of these embodiments are for the purpose of illustration rather than to limit the scope of the present invention. It should be noted that, elements unrelated to the present invention are omitted from depiction in the following embodiments and the attached drawings. In addition, the dimensions of elements and any dimensional scales between individual elements in the attached drawings are provided only for ease of depiction and illustration but not to limit the scope of the present invention.

Figure 1A:
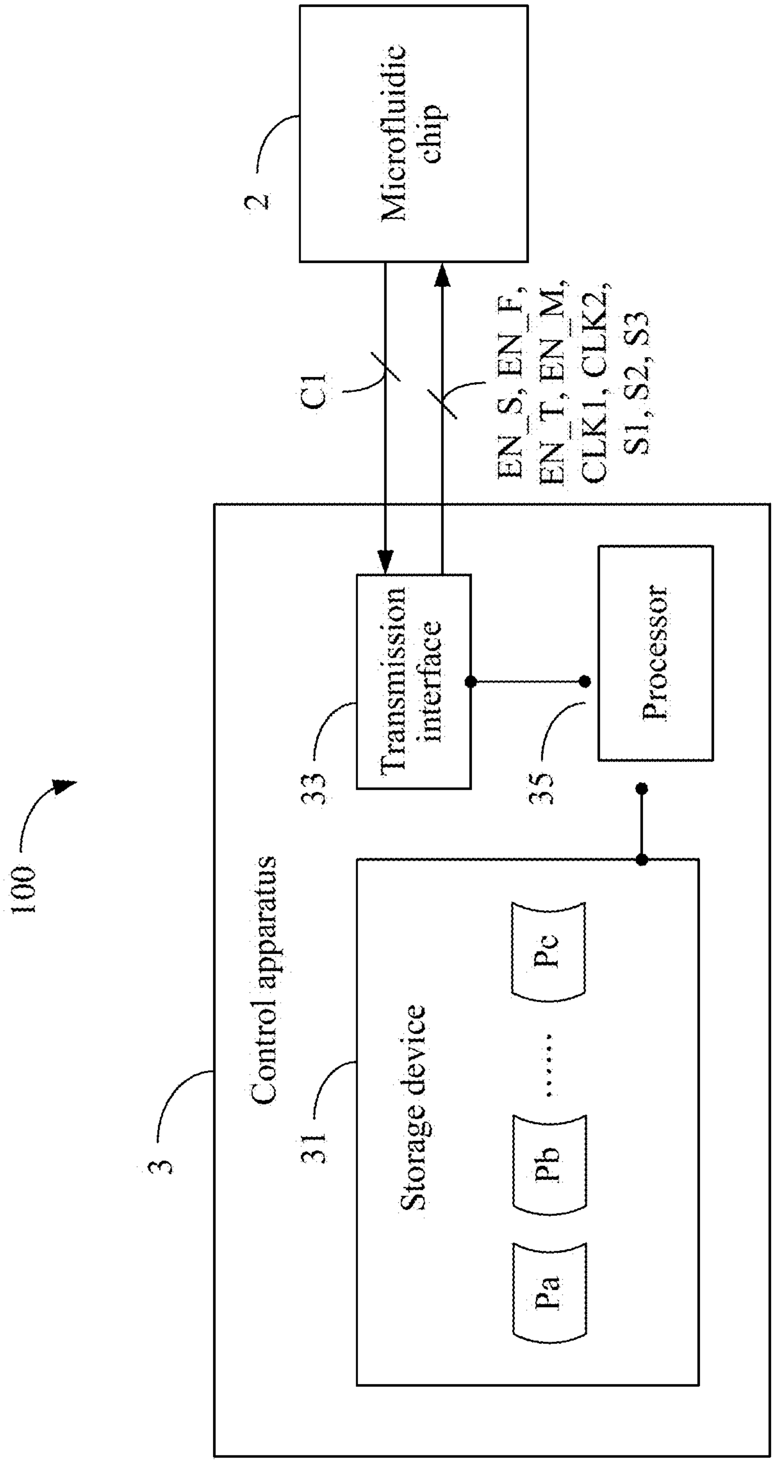
FIG. 1A illustrates the schematic view of the system architecture of a microfluidic processing system in some embodiments.

FIG. 1A illustrates the schematic view of a microfluidic processing system 100 in some embodiments of the present invention. The microfluidic processing system 100 comprises a microfluidic chip 2 and a control apparatus 3, wherein the microfluidic chip 2 and the control apparatus 3 cooperate to perform one or more biomedical processes (e.g., target extractions, biomedical tests). In the following descriptions, the hardware architectures of the microfluidic chip 2 and the control apparatus 3 will be given first, and the operations performed by the microfluidic chip 2 and the control apparatus 3 will be given later.

The Architecture of the Microfluidic Chip

Figure 1B:
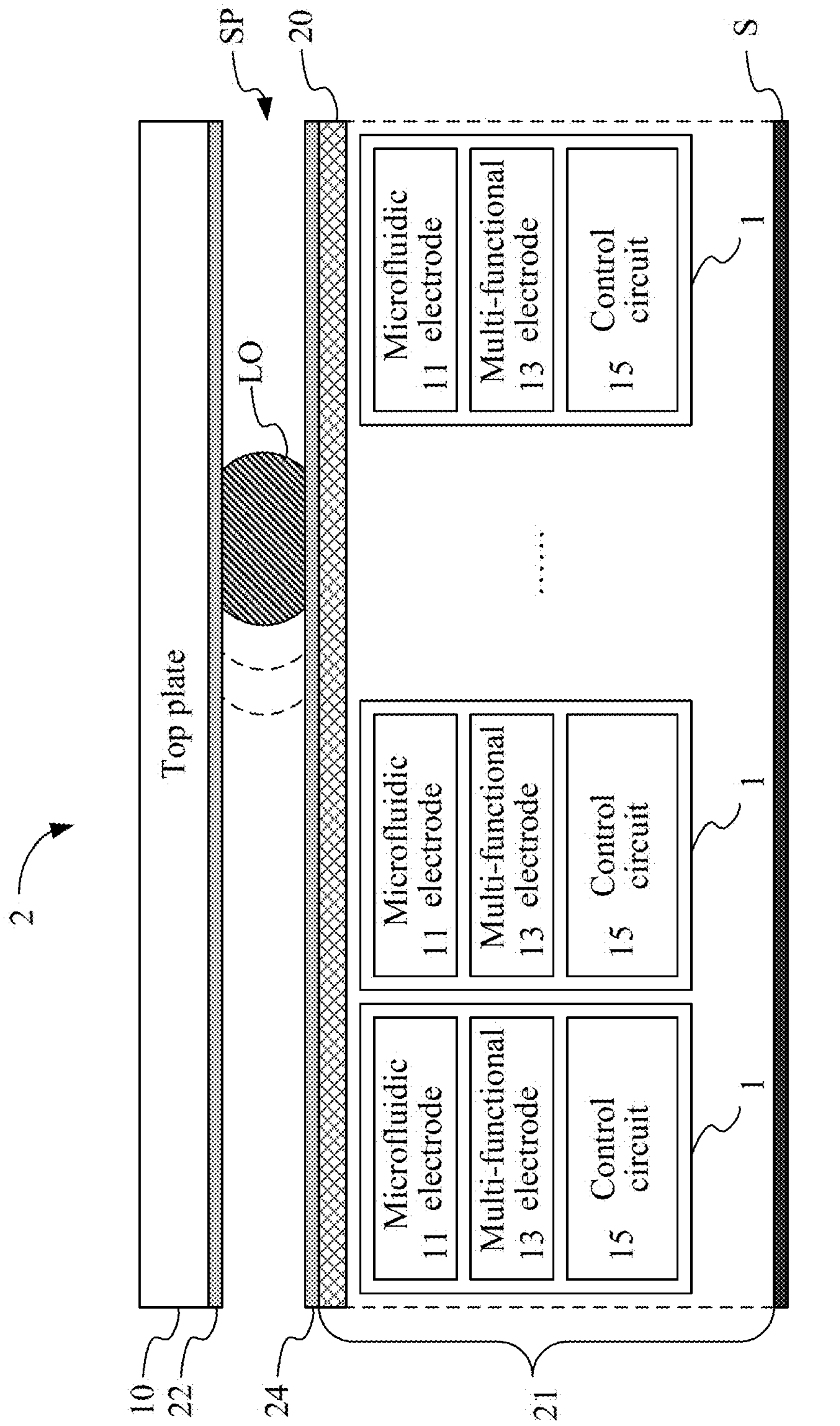
FIG. 1B illustrates the lateral view of the microfluidic chip.
Figure 1C:
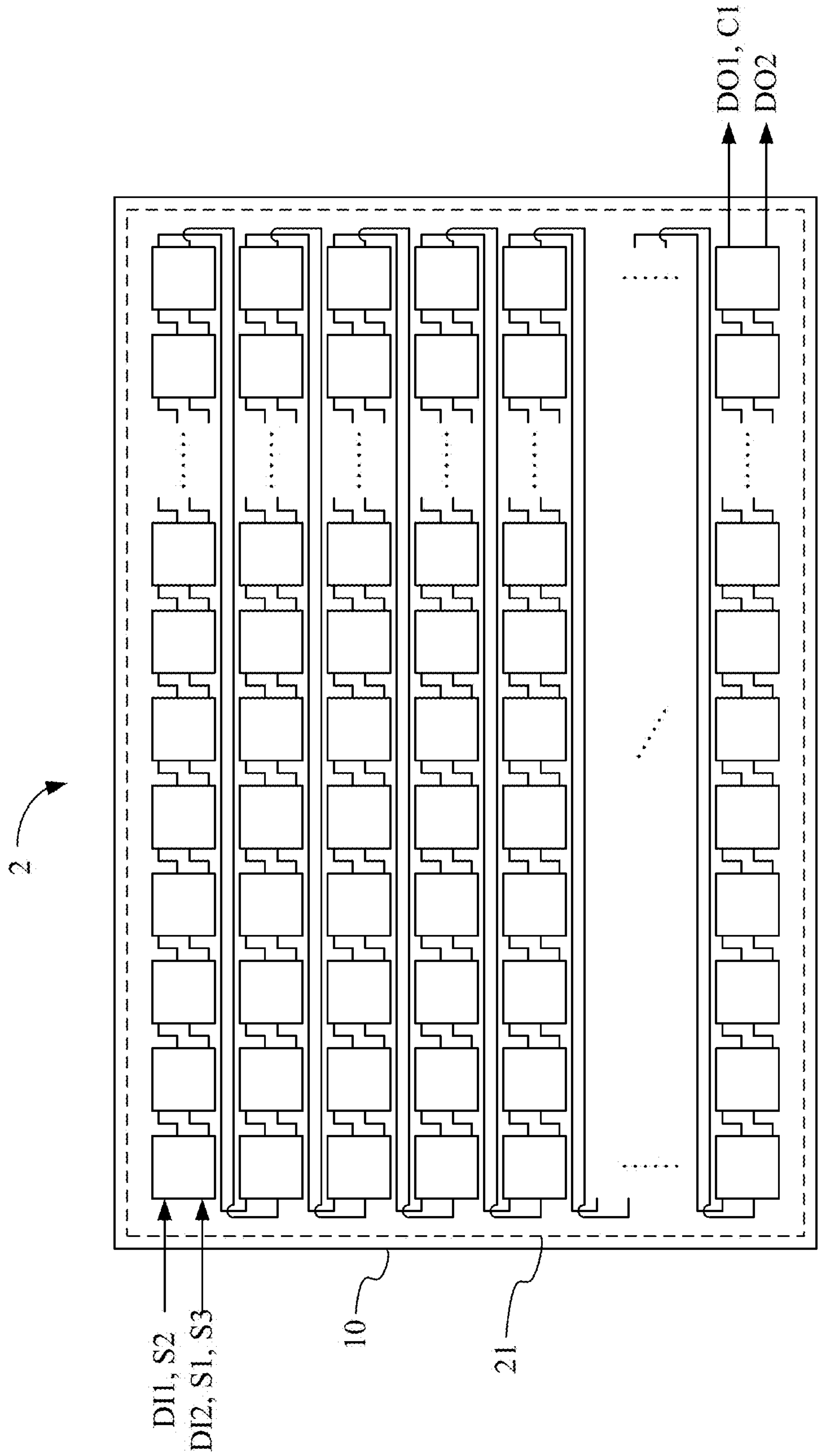
FIG. 1C illustrates the top view of the microfluidic chip.

FIG. 1B and FIG. 1C illustrate the lateral view and the top view of the microfluidic chip 2 respectively. The microfluidic chip 2 comprises a top plate 10 and a microelectrode dot array 21, wherein the microelectrode dot array 21 is arranged under the top plate 10. The top plate 10 can be formed by a conductive material, e.g., an Indium Tin Oxide (ITO) glass. A space SP is defined under the top plate 10 and above the microelectrode dot array 21, and at least one droplet LO can be placed and moved within the space SP under the control of the control apparatus 3 (will be detailed later). In some embodiments, a droplet may be a test sample (i.e., a sample to be tested), a reagent, or a buffer (e.g., lysing buffer, binding buffer, washing buffer, elution buffer used in DNA extraction).

In some embodiments, the microfluidic chip 2 may further comprise two hydrophobic layers 22, 24. The hydrophobic layer 22 is arranged under the top plate 10 and in contact with the top plate 10 directly, while the hydrophobic layer 24 is arranged above the microelectrode dot array 21. The space SP, for droplet(s) to be moved within, can be defined by the hydrophobic layers 22, 24. Each of the hydrophobic layers 22, 24 can be formed by a hydrophobic material.

The microelectrode dot array 21 comprises a plurality of microelectrode devices 1 connected in a series. The microelectrode devices 1 are arranged in a two-dimensional array of the size p×q, wherein both p and q are positive integers greater than 1. The control apparatus 3 also knows that the microelectrode devices 1 are arranged in a two-dimensional array of the size p×q. Each microelectrode device 1 comprises a microfluidic electrode 11, a multi-functional electrode 13 (this can be used as a heating electrode, an insulation layer, or a magnetic field providing layer depending on the operation being performed, which will be elaborated later), and a control circuit 15. Each microfluidic electrode 11 is arranged under the top plate 10, each multi-functional electrode 13 is arranged under the corresponding microfluidic electrode 11 (i.e., the microfluidic electrode 11 belonging to the same microelectrode device 1), and each control circuit 15 is arranged under the corresponding multi-functional electrode 13 (i.e., the multi-functional electrode 13 belonging to the same microelectrode device 1). In some embodiments, the microelectrode dot array 21 may further comprise a microelectrode interface 20 arranged above the microelectrode devices 1 and under the hydrophobic layer 24. The microelectrode interface 20 is used for interfacing the hydrophobic layer 24 and can be a $SiO_2$ insulation layer.

The size of each microelectrode device 1 is not limited to any specific size in the present invention. Nevertheless, in some embodiments, the area of the top surface of each microelectrode device 1 can be 2,500 $\mu m^2$. In addition, the distance between any two neighboring microelectrode devices 1 is not limited to any specific distance in the present invention. In some embodiments, the distance between a microelectrode device 1 and its neighboring microelectrode device 1 can be 1 μm.

In FIG. 1C, each square represents a microelectrode device 1, wherein each of the microelectrode devices 1 has two input terminals (i.e., a first input terminal and a second input terminal) and two output terminals (i.e., a first output terminal and a second output terminal). The microelectrode devices 1 are connected in a series in terms of having a first input/output chain and a second input/output chain. For each of the microelectrode devices 1 except the first microelectrode device 1, the first input terminal is coupled to the first output terminal of the previous microelectrode device 1 to form the first input/output chain. In this way, each of the microelectrode devices 1 except the first microelectrode device 1 receives the input signal DI1 (e.g., sample operation configurations) through the microelectrode device(s) 1 arranged ahead, and each of the microelectrode devices 1 except the last microelectrode device 1 provides the output signal DO1 (e.g., the stored capacitance values) through the microelectrode device(s) 1 arranged behind. Similarly, for each of the microelectrode devices 1 except the first microelectrode device 1, the second input terminal is coupled to the second output terminal of the previous microelectrode device 1 to form the second input/output chain. In this way, each of the microelectrode devices 1 except the first microelectrode device 1 receives the input signal DI2 (e.g., heating control configurations, magnetic field control configurations) through the microelectrode device(s) 1 arranged ahead, and each of the microelectrode devices 1 except the last microelectrode device 1 provides the output signal DO2 (e.g., the stored capacitance values) through the microelectrode device(s) 1 arranged behind.

Figure 1D:
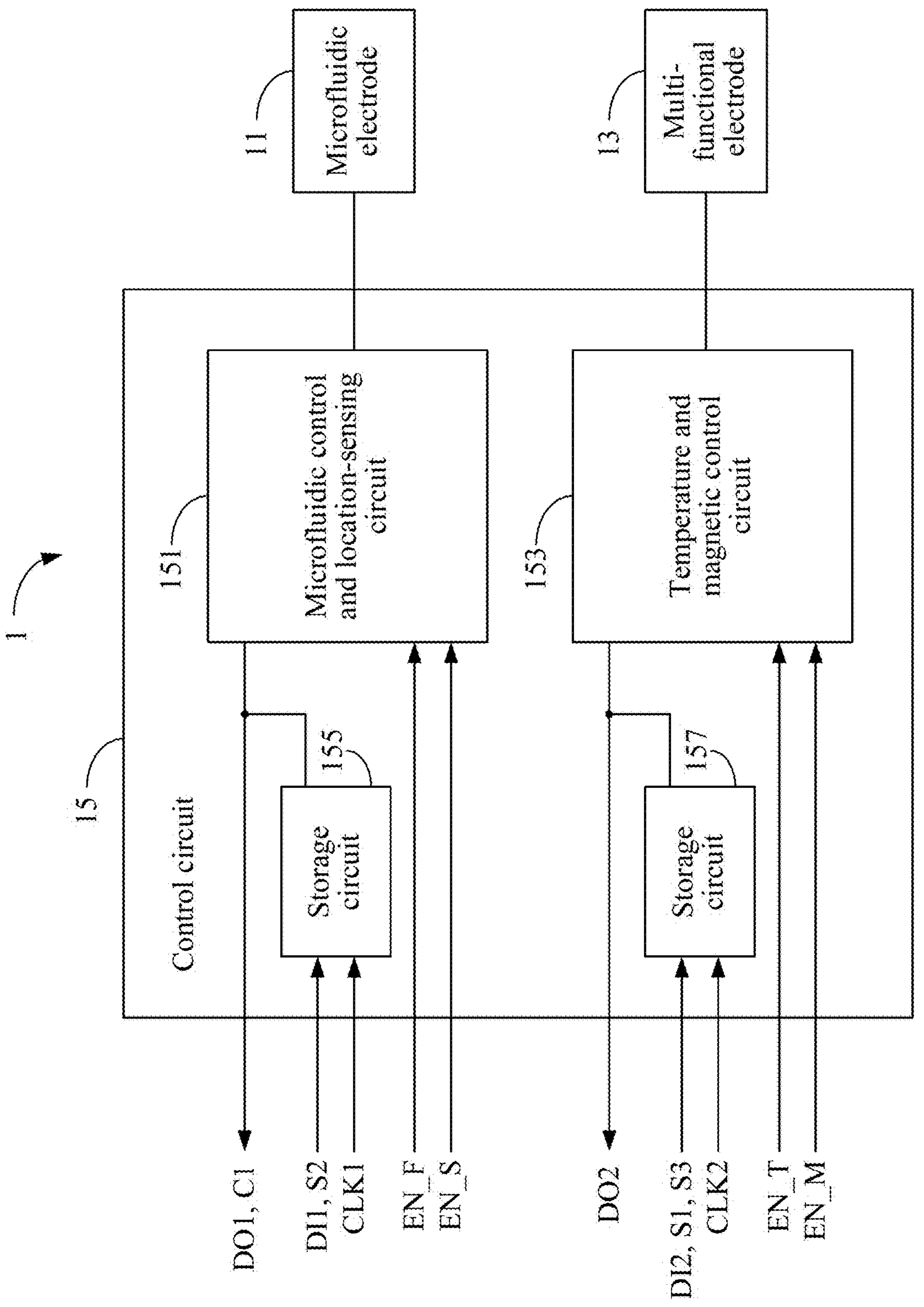
FIG. 1D illustrates the circuit block diagram of a microelectrode device.

FIG. 1D illustrates the circuit block diagram of each microelectrode device 1 of the microelectrode dot array 21. Each microelectrode device 1 comprises a microfluidic electrode 11, a multi-functional electrode 13, and a control circuit 15, and the control circuit 15 of each microelectrode device 1 comprises a microfluidic control and location-sensing circuit 151, a temperature and magnetic control circuit 153, and two storage circuits 155, 157. In each microelectrode device 1, the microfluidic control and location-sensing circuit 151 is coupled to the microfluidic electrode 11 and the storage circuit 155, and the temperature and magnetic control circuit 153 is coupled to the multi-functional electrode 13 and the storage circuit 157. For each microelectrode device 1, the aforesaid first input terminal and the aforesaid first output terminal are of the storage circuit 155, and the aforesaid second input terminal and the aforesaid second output terminal are of the storage circuit 157. It means that the aforesaid first input/output chain is formed by connecting the storage circuits 155, and the aforesaid second input/output chain is formed by connecting the storage circuits 157.

Each microfluidic control and location-sensing circuit 151 may receive a sample control signal EN_F and a location-sensing signal EN_S. Each storage circuit 155 may receive a clock signal CLK1, receive and store an input signal DI1 (e.g., sample operation configuration), and provide an output signal DO1 (e.g., the stored capacitance value). Each temperature and magnetic control circuit 153 may receive a heating control signal EN_T and a magnetic field control signal EN_M. Each storage circuit 157 may receive a clock signal CLK2, receive and store an input signal DI2 (e.g., heating control configuration, magnetic field control configuration), and provide an output signal DO2 (e.g., the stored capacitance value). Furthermore, a voltage signal VS (e.g., 1 kHz 50 Vp-p square wave) can be provided at the top of the top plate 10 to generate enough driving force by the EWOD technique for moving the droplet(s) in the space SP between the top plate 10 and the microelectrode dot array 21.

Figure 1E:
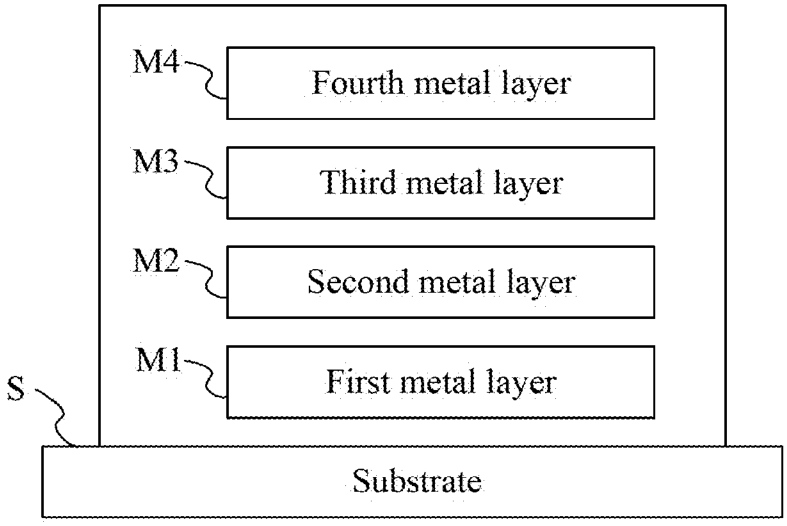
FIG. 1E illustrates a schematic view of a semiconductor structure having four metal layers.
Figure 1F:
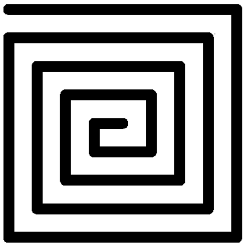
FIG. 1F illustrates a spiral multi-functional electrode adopted in some embodiments.

In some embodiments, a semiconductor process (e.g., 0.35 μm 2P4M complementary metal-oxide semiconductor (CMOS) technology provided by Taiwan Semiconductor Manufacturing Company) that can form the semiconductor structure as shown in FIG. 1E can be adopted to make the microelectrode devices 1. The semiconductor structure shown in FIG. 1E comprises a substrate S and four metal layers on top of the substrate S, wherein the four metal layers include the first metal layer M1, the second metal layer M2, the third metal layer M3, and the fourth metal layer M4 from the bottom to the top. In those embodiments, the control circuits 15 of the microelectrode devices 1 can be formed at the first metal layer M1 and the second metal layer M2, the multi-functional electrodes 13 of the microelectrode devices 1 can be formed at the third metal layer M3, and the microfluidic electrodes 11 of the microelectrode devices 1 can be formed at the fourth metal layer M4. In some embodiments, to make the multi-functional electrodes 13 provide magnetic fields, the shape of each multi-functional electrode 13 is a spiral, as illustrated in FIG. 1F.

The Architecture of the Control Apparatus

FIG. 1A also shows the hardware architecture of the control apparatus 3. The control apparatus 3 comprises a storage device 31, at least one transmission interface 33, and a processor 35, wherein the processor 35 is electrically connected to the storage device 31 and the at least one transmission interface 33. The storage device 31 can be a memory, a Universal Serial Bus (USB) disk, a portable disk, a Hard Disk Drive (HDD), or any other non-transitory storage media, apparatus, or circuit with the same functions and well-known to a person having ordinary skill in the art. Each transmission interface 33 can be a digital input/output interface card that can communicate with a biochip and is well-known to a person having ordinary skill in the art. The processor 35 can be one of the various processors, central processing units (CPUs), microprocessor units (MPUs), digital signal processors (DSPs), or other computing apparatuses well known to a person having ordinary skill in the art. In some embodiments, the control apparatus 3 can be a desktop computer, a notebook computer, or a mobile device (e.g., a tablet computer, or a smartphone). The processor 35 is configured to generate various control signals and configurations for controlling the microfluidic chip 2, while the at least one transmission interface 33 is configured to transmit these control signals and configurations to the microfluidic chip 2.

The Operations Performed by the Microfluidic Chip and the Control Apparatus

The operations that can be performed by the microfluidic chip 2 and the control apparatus 3 include positioning one or more droplets accurately, applying sample operation(s) to one or more droplets (e.g., moving one or more droplets, cutting a droplet, mixing droplets), applying a magnetic field to one or more droplets, heating one or more droplets, etc. The aforesaid operations can be performed individually or in combination. In some embodiments, the aforesaid operations can be arranged differently to perform other biomedical processes. The operations that can be performed by the microfluidic chip 2 and the control apparatus 3 are detailed below.

Positioning Droplet(s)

The microfluidic processing system 100 can detect every droplet in the microfluidic chip 2 (specifically, in the space SP of the microfluidic chip 2) and position every droplet in the microfluidic chip 2 (i.e., determine the size and the location of every droplet in the microfluidic chip 2).

Figure 2A:
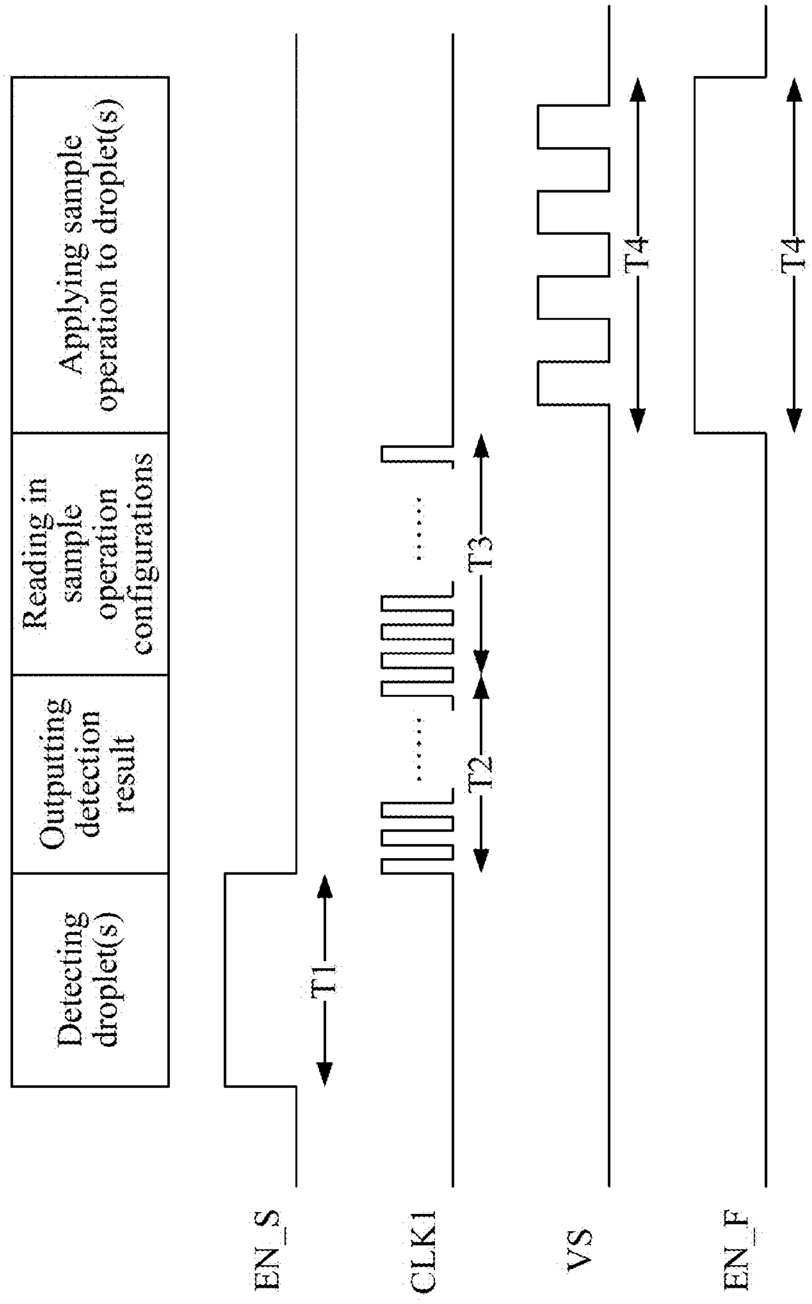
FIG. 2A illustrates an exemplary timing diagram for positioning droplet(s) and applying one or more sample operations to the droplet(s).

Please refer to an exemplary timing diagram in FIG. 2A, which, however, is not intended to limit the scope of the present invention. The control apparatus 3 provides a location-sensing signal EN_S to the microfluidic chip 2 via the transmission interface 33, wherein the location-sensing signal EN_S is enabled within a time interval T1 (e.g., the voltage level of the location-sensing signal EN_S can be high within the time interval T1). Since the location-sensing signal EN_S is enabled within the time interval T1, the microfluidic control and location-sensing circuit 151 of each microelectrode device 1 detects a capacitance value between the top plate 10 and the corresponding microfluidic electrode 11 and stores the capacitance value in the corresponding storage circuit 155 during the time interval T1. Each of the capacitance values C1 reflects whether there is any liquid between the top plate 10 and the corresponding microfluidic electrode 11. If using the numerical values "0" and "1" to indicate the detected capacitance values, the numerical value "1" may be used to indicate having liquid between the top plate 10 and the microfluidic electrode 11 and the numerical value "0" may be used to indicate no liquid between the top plate 10 and the microfluidic electrode 11.

In addition, the control apparatus 3 provides a clock signal CLK1 to the microfluidic chip 2 via the transmission interface 33, wherein the clock signal CLK1 is enabled within a plurality of sub-time intervals of a time interval T2 (e.g., the voltage level of the clock signal CLK1 can be high within the sub-time intervals of the time interval T2). The time interval T2 is after the time interval T1. The sub-time intervals of the time interval T2 correspond to the storage circuits 155 of the microelectrode devices 1 one-to-one. If the microelectrode dot array 21 comprises N microelectrode devices 1, the time interval T2 has N sub-time intervals, wherein N is a positive integer. Since the clock signal CLK1 is enabled within the sub-time intervals of the time interval T2, the storage circuits 155 output the capacitance values C1 during the sub-time intervals of the time interval T2 respectively. The present invention does not restrict the clock rate of the clock signal CLK1 to any specific rate. For example, the storage circuits 155 may output the capacitance values C1 under the setting that the clock rate of the clock signal CLK1 is 100 kHz.

The control apparatus 3 receives the capacitance values C1 from the microfluidic chip 2 via the transmission interface 33. The control apparatus 3 knows that the microelectrode devices 1 are arranged in a two-dimensional array of the size p×q and that the capacitance values C1 correspond to the microelectrode devices 1 one-to-one. Hence, the processor 35 of the control apparatus 3 can detect every droplet in the microfluidic chip 2 according to the capacitance values C1 and determine the size and the location of every droplet according to the capacitance values C1.

Figure 2B:
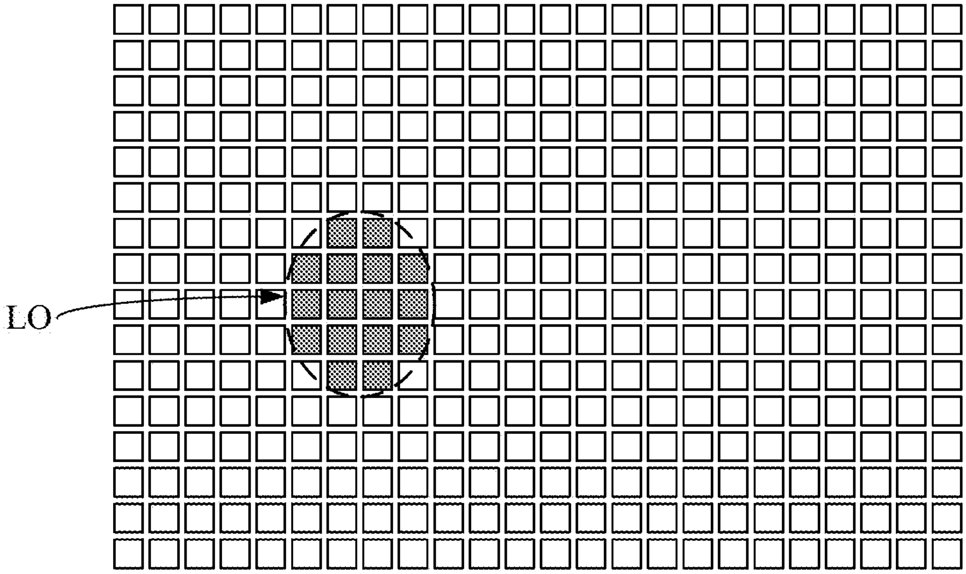
FIG. 2B illustrates an example regarding the determination of the size and the location of a droplet according to the capacitance values.

Please refer to a specific example shown in FIG. 2B for a better understanding, however, it is not intended to limit the scope of the present invention. FIG. 2B illustrates the capacitance values C1 arranged in a two-dimensional array of the size p×q. In FIG. 2B, the N squares respectively represent the capacitance values C1 of the N microelectrode devices 1, wherein each white square indicates that the corresponding capacitance value is of the numerical value "0" and each grey square indicates that the corresponding capacitance value is of the numerical value "1." With the knowledge that the microelectrode devices 1 are arranged in a two-dimensional array of the size p×q, the processor 35 of the control apparatus 3 can determine that there is one droplet LO in the microfluidic chip 2 according to the capacitance values C1 and determine the size and the location of the droplet LO in the microfluidic chip 2 according to the capacitance values C1.

Please note that if the control apparatus 3 knows the size and the location of the droplet(s) that is/are going to be processed, the aforesaid operations regarding positioning droplet(s) can be omitted.

Applying Sample Operation(s)

It is assumed that the control apparatus 3 already knows the size and the location of the droplet(s) (e.g., the control apparatus 3 has positioned the droplet(s) in the microfluidic chip 2 in the time intervals T1, T2). The control apparatus 3 can control the microfluidic chip 2 to apply sample operation (s) to one or more droplets (e.g., moving one or more droplets, cutting a droplet, mixing droplets) in the microfluidic chip 2.

The control apparatus 3 generates a plurality of sample operation configurations according to a sample operation requirement (e.g., moving droplet(s) to assigned location(s), cutting a droplet, mixing droplets) and the size and the location of at least one droplet in the microfluidic chip 2, wherein the sample operation configurations correspond to the microelectrode devices 1 one-to-one. Each of the sample operation configurations is used to instruct the corresponding microfluidic control and location-sensing circuit 151 to enter a sample control status (i.e., function or not function) corresponding to the sample operation configuration during a sample operation time interval.

Figure 2C:
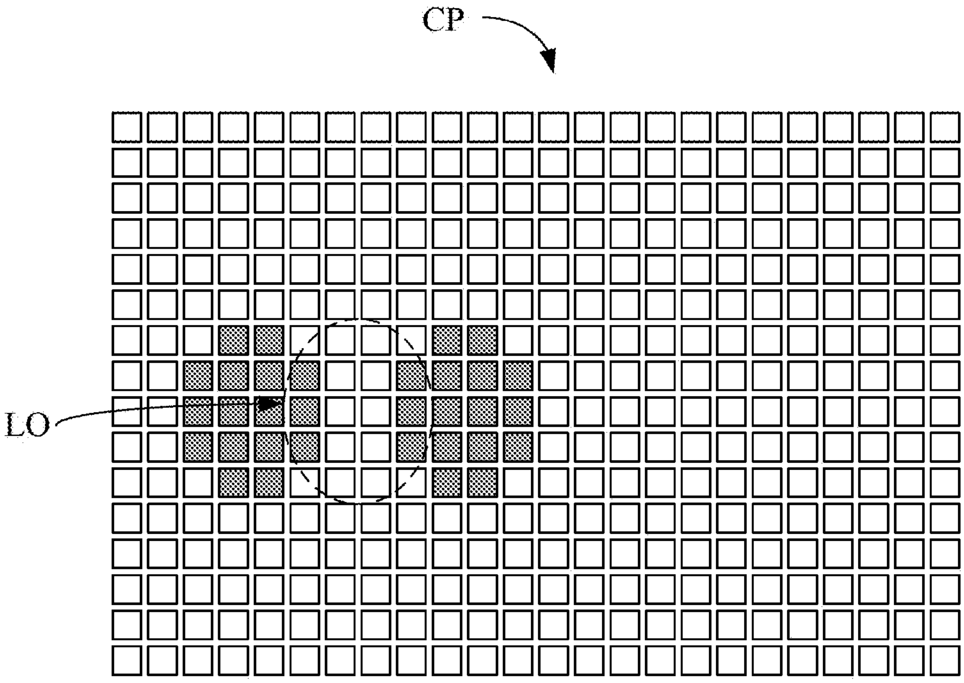
FIG. 2C illustrates an exemplary sample control pattern.

In some embodiments, the processor 35 of the control apparatus 3 may generate a sample control pattern according to a sample operation requirement and the size and the location of at least one droplet and then generate the sample operation configurations according to the sample control pattern. Please refer to an exemplary sample control pattern CP shown in FIG. 2C, which, however is not intended to limit the scope of the present invention. The sample control pattern CP is used for cutting the droplet LO into two small droplets. In FIG. 2C, the N squares respectively correspond to the N sample operation configurations that will be read in by the N storage circuits 155, wherein each grey square represents "function" and each white represents "not function." The processor 35 of the control apparatus 3 generates the sample operation configurations according to the sample control pattern CP. For example, the sample operation configuration corresponding to a white square may be of the numerical value "0" and the sample operation configuration corresponding to a grey square may be of the numerical value "1."

The control apparatus 3 provides the sample operation configurations S2 to the microfluidic chip 2 via the transmission interface 33. Please refer to an exemplary timing diagram in FIG. 2A. The clock signal CLK1 provided to the microfluidic chip 2 by the control apparatus 3 is enabled within a plurality of sub-time intervals of a time interval T3 (e.g., the voltage level of the clock signal CLK1 can be high within the sub-time intervals of the time interval T3). The time interval T3 is after the time interval T2. The sub-time intervals of the time interval T3 correspond to the storage circuits 155 of the microelectrode devices 1 one-to-one. In this way, the storage circuits 155 read in the sample operation configurations S2 during the sub-time intervals of the time interval T3 respectively.

The control apparatus 3 provides a sample control signal EN_F to the microfluidic chip 2 via the transmission interface, and the sample control signal EN_F is enabled within a time interval T4 (e.g., the voltage level of the sample control signal EN_F can be high within the time interval T4). In addition, the voltage level of the voltage signal VS provided to the top of the top plate 10 is high during the time interval T4, and the voltage level of the voltage signal VS provided to the top of the top plate 10 is low during other time intervals. The time interval T4 is the aforesaid sample operation time interval. During the time interval T4, the sample control signal EN_F is enabled, and the voltage level of the voltage signal VS is high. Hence, the microfluidic control and location-sensing circuit 155 of each microelectrode device 1 enters a sample control status (i.e., function or not function) according to the corresponding sample operation configuration during the time interval T4. In this way, the required sample operation (e.g., moving droplet(s), cutting a droplet, mixing droplets) is accomplished within time interval T4. Please note that during the sample operation time interval (e.g., the time interval T4), each multi-functional electrode 13 is an insulation layer (e.g., connecting to a low voltage level).

Applying a Magnetic Field to Droplet(s)

Figure 3A:
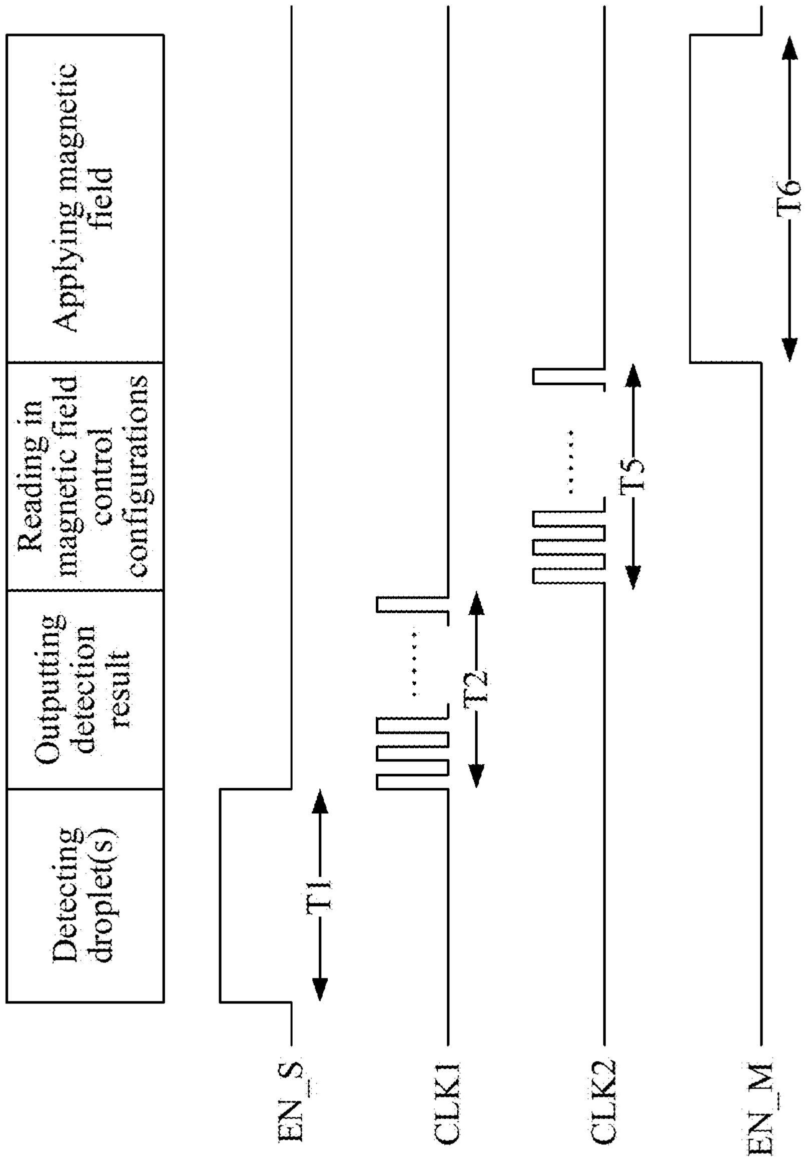
FIG. 3A illustrates an exemplary timing diagram for positioning droplet(s) and applying a magnetic field to droplet(s).
Figure 3B:
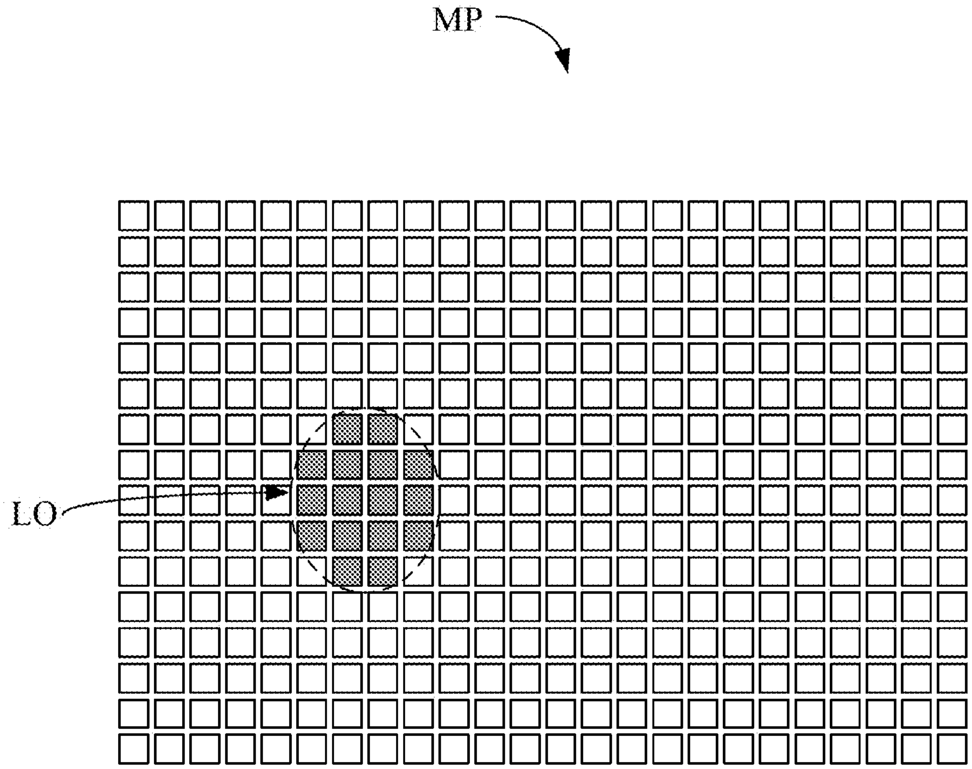
FIG. 3B illustrates an exemplary magnetic field pattern.

It is assumed that the control apparatus 3 already knows the size and the location of the droplet(s) (e.g., the control apparatus 3 has positioned the droplet(s) in the microfluidic chip 2 in the time intervals T1, T2). The control apparatus 3 is able to control the microfluidic chip 2 to apply magnetic field(s) to the droplet(s) in the microfluidic chip 2. Please refer to an exemplary timing diagram shown in FIG. 3A and an exemplary magnetic field pattern shown in FIG. 3B for the following descriptions.

The control apparatus 3 generates a plurality of magnetic field control configurations according to a magnetic field requirement (e.g., the intensity of the magnetic field) and the size and the location of at least one droplet in the microfluidic chip 2, wherein the magnetic field control configurations correspond to the microelectrode devices 1 one-to-one. Each of the magnetic field control configurations is used to instruct the corresponding temperature and magnetic control circuit 153 to enter a magnetic control status (i.e., whether to provide magnetic control or not) corresponding to the magnetic field control configuration during a magnetic control time interval. In some embodiments, providing magnetic control means turning on a switch comprised in the temperature and magnetic control circuit 153 and supplying an alternating voltage to the temperature and magnetic control circuit 153.

In some embodiments, the processor 35 of the control apparatus 3 may generate a magnetic field pattern according to a magnetic field requirement and the size and the location of at least one droplet and then generate the magnetic field control configurations according to the magnetic field pattern. In the exemplary magnetic field pattern MP shown in FIG. 3B, the N squares respectively correspond to the N magnetic field control configurations that will be read in by the N storage circuits 157, wherein each grey square represents "providing magnetic control" and each white represents "not providing magnetic control." The processor 35 of the control apparatus 3 then generates the magnetic field control configurations according to the magnetic field pattern MP. For example, the magnetic field control configuration corresponding to a white square may be of the numerical value "0", and the magnetic field control configuration corresponding to a grey square may be of the numerical value "1."

The control apparatus 3 provides the magnetic field control configurations S3 to the microfluidic chip 2 via the transmission interface 33 to apply a corresponding magnetic field. Specifically, the control apparatus 3 provides a clock signal CLK2 to the microfluidic chip 2 via the transmission interface 33, wherein the clock signal CLK2 is enabled within a plurality of sub-time intervals of a time interval T5 (e.g., the voltage level of the clock signal CLK2 can be high within the sub-time intervals of the time interval T5). The time interval T5 is after the time interval T2. The sub-time intervals of the time interval T5 correspond to the storage circuits 157 of the microelectrode devices 1 one-to-one. In this way, the storage circuits 157 read in the magnetic field control configurations S3 during the sub-time intervals of the time interval T5 respectively.

The control apparatus 3 provides a magnetic field control signal EN_M to the microfluidic chip 2 via the transmission interface, wherein the magnetic field control signal EN_M is enabled within a time interval T6 (e.g., the voltage level of the magnetic field control signal EN_M can be high within the time interval T6). The time interval T6 is after the time interval T5. The time interval T6 is the aforesaid magnetic control time interval. Since the magnetic field control signal EN_M is enabled within the time interval T6, the temperature and magnetic control circuit 153 of each microelectrode device 1 enters a magnetic control status (i.e., whether to provide magnetic control or not) according to the corresponding magnetic field control configuration during the time interval T6.

In some embodiments, providing magnetic control means turning on a switch comprised in the temperature and magnetic control circuits 153 and supplying an alternating voltage to the temperature and magnetic control circuits 153. In those embodiments, if a magnetic field control configuration instructs the corresponding temperature and magnetic control circuit 153 to provide magnetic control (e.g., the magnetic field control configuration is of the numerical value "1"), the temperature and magnetic control circuit 153 lets its switch on during the time interval T6 and an alternating voltage is supplied to the temperature and magnetic control circuit 153 during the time interval T6 so that the corresponding multi-functional electrode 13 provides magnetic field (i.e., the multi-functional electrode 13 can be considered as a magnetic field in use). On the contrary, if a magnetic field control configuration instructs the corresponding temperature and magnetic control circuit 153 not to provide magnetic control (e.g., the magnetic field control configuration is of the numerical value "0"), the temperature and magnetic control circuit 153 lets its switch off during the time interval T16 so that the corresponding multi-functional electrode 13 does not provide magnetic control (i.e., the multi-functional electrode 13 can be considered as a magnetic field not in use). In this way, the required magnetic field is applied to the droplet(s) in the microfluidic chip 2 during the time interval T6.

Heating Droplet(s)

Figure 4A:
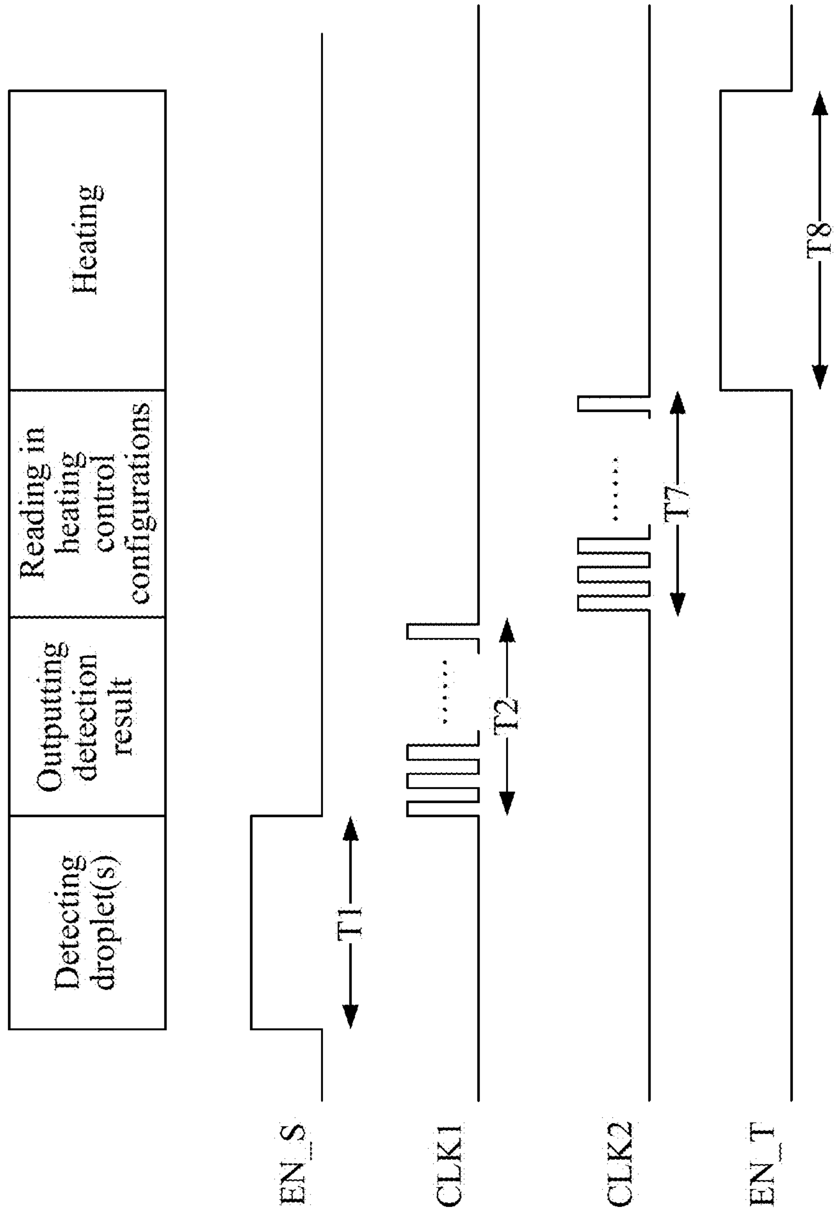
FIG. 4A illustrates an exemplary timing diagram for positioning droplet(s) and heating the droplet(s).

It is assumed that the control apparatus 3 already knows the size and the location of the droplet(s) (e.g., the control apparatus 3 has positioned the droplet(s) in the microfluidic chip 2 in the time intervals T1, T2). The control apparatus 3 is able to control the microfluidic chip 2 to heat the droplet(s) in the microfluidic chip 2. Please refer to the exemplary timing diagram shown in FIG. 4A and the two exemplary heating control patterns shown in FIG. 4B, and FIG. 4C for the following descriptions.

The control apparatus 3 generates a plurality of heating control configurations according to a temperature requirement (e.g., the test environment has to be 95 degrees Celsius) and the size and the location of at least one droplet in the microfluidic chip 2, wherein the heating control configurations correspond to the microelectrode devices 1 one-to-one. Each of the heating control configurations is used to instruct the corresponding temperature and magnetic control circuit 153 to enter a heating control status (i.e., whether to perform heating or not) corresponding to the heating control configuration during a heating time interval. In some embodiments, performing heating means turning on a switch comprised in the temperature and magnetic control circuits 153 and supplying a direct voltage to the temperature and magnetic control circuits 153 to perform heating.

In some embodiments, the processor 35 of the control apparatus 3 may generate a heating control pattern according to a temperature requirement and the size and the location of at least one droplet and then generate the heating control configurations according to the heating control pattern. Regarding the exemplary heating control pattern HP1 shown in FIG. 4B, the N squares respectively correspond to the N heating control configurations that will be read in by the N storage circuits 157, wherein each grey square represents "perform heating" and each white represents "not to perform heating." The processor 35 of the control apparatus 3 generates the heating control configurations according to the heating control pattern HP1. For example, the heating control configuration corresponding to a white square may be of the numerical value "0" and the heating control configuration corresponding to a grey square may be of the numerical value "1."

In some embodiments, the heating control pattern generated by the control apparatus 3 may comprise a heating area and an annular non-heating area, wherein the annular non-heating area encompasses the heating area, and the location of the droplet LO corresponds to a center of the heating area. The annular non-heating area can be called a guard ring. By having a guard ring encompassing the heating area, the heating effect within the heating area will not be affected by the environmental temperature outside. Therefore, the target temperature will be reached with a better temperature change rate and less energy consumption.

Figure 4B:
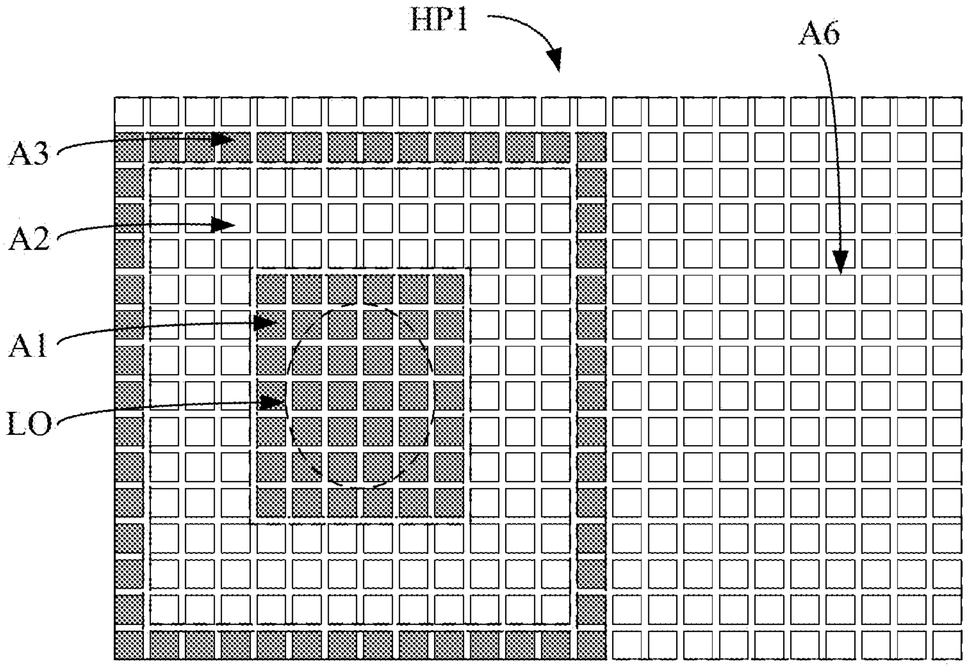
FIG. 4B illustrates an exemplary heating control pattern.
Figure 4C:
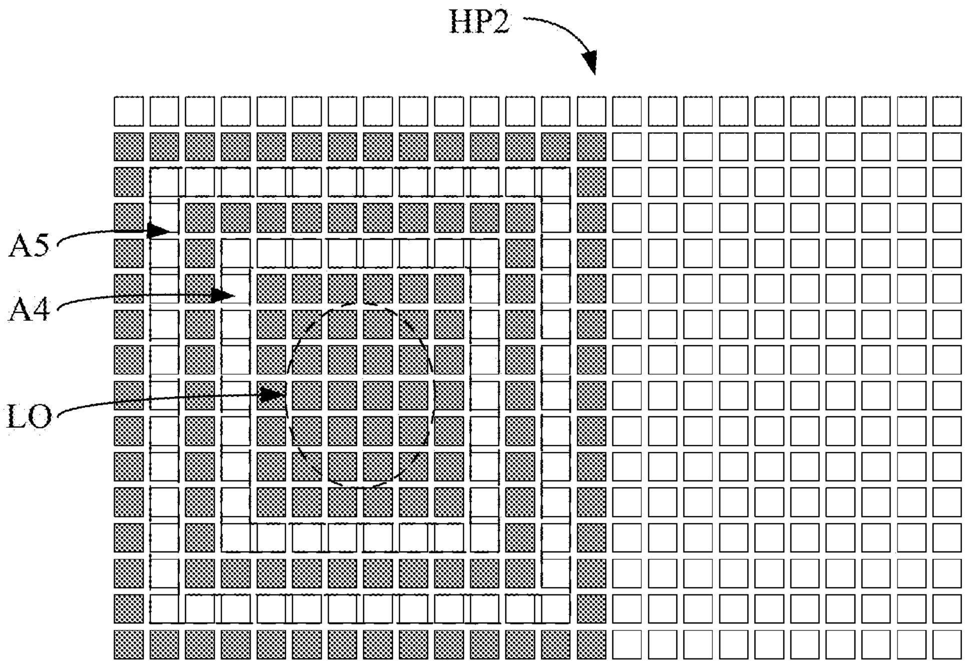
FIG. 4C illustrates another exemplary heating control pattern.

The heating control pattern HP1 shown in FIG. 4B has a guard ring. To be more specific, the heating control pattern HP1 comprises a heating area A1 (i.e., the grey squares that cover the droplet LO in FIG. 4B), an annular non-heating area A2 (i.e., the white squares that encompass the previously mentioned grey squares in FIG. 4B), another heating area A3 (i.e., the grey squares that encompass the previously mentioned white squares in FIG. 4B), and another non-heating area A6. The location of the droplet LO corresponds to the center of the heating area A1. The annular non-heating area A2 encompasses the heating area A1, another heating area A3 encompasses the annular non-heating area A2, and the rest area is the non-heating area A6. The number of the multi-functional electrodes (used as heating electrodes) within the heating area A1 and the heating area A3 depends on the temperature requirement (i.e., the certain degree of temperature that has to reach) specified in the test protocol. The higher the required temperature, the greater the number of the multi-functional electrodes within the heating area A1 and the heating area A3. The present invention does not restrict the number of annular non-hearing areas (i.e., the number of guard rings) within a heating control pattern to any specific number. Another specific example in FIG. 4C shows the heating control pattern HP2 with two guard rings (i.e., the annular non-heating areas A4, A5).

The control apparatus 3 provides the heating control configurations S1 to the microfluidic chip 2 via the transmission interface 33. Specifically, the clock signal CLK2 provided by the control apparatus 3 to the microfluidic chip 2 is enabled within a plurality of sub-time intervals of a time interval T7 (e.g., the voltage level of the clock signal CLK2 can be high within the sub-time intervals of the time interval T7). The time interval T7 is after the time interval T2. The sub-time intervals of the time interval T7 correspond to the storage circuits 157 of the microelectrode devices 1 one-to-one. In this way, the storage circuits 157 read in the heating control configurations S1 during the sub-time intervals of the time interval T7 respectively.

The control apparatus 3 provides a heating control signal EN_T to the microfluidic chip 2 via the transmission interface, wherein the heating control signal EN_T is enabled within a time interval T8 (e.g., the voltage level of the heating control signal EN_T can be high within the time interval T8). The time interval T8 is after the time interval T7. The time interval T8 is the aforesaid heating time interval. Since the heating control signal EN_T is enabled within the time interval T8, the temperature and magnetic control circuit 153 of each microelectrode device 1 enters a heating control status (i.e., whether to perform heating or not) according to the corresponding heating control configuration during the time interval T8.

In some embodiments, performing heating means turning on a switch comprised in the temperature and magnetic control circuits 153 and supplying a direct voltage to the temperature and magnetic control circuits 153. In those embodiments, if a heating control configuration instructs the corresponding temperature and magnetic control circuit 153 to perform heating (e.g., the heating control configuration is of the numerical value “1”), the temperature and magnetic control circuit 153 lets its switch on during the time interval T8 (i.e., the heating time interval) and a direct voltage is supplied to the temperature and magnetic control circuit 153 so that the corresponding multi-functional electrode 13 performs heating (i.e., the multi-functional electrode 13 can be considered as a heating electrode in use). On the contrary, if a heating control configuration instructs the corresponding temperature and magnetic control circuits 153 not to perform heating (e.g., the heating control configuration is of the numerical value “0”), the temperature and magnetic control circuit 153 lets its switch off during the time interval T8 (i.e., the heating time interval) so that the corresponding multi-functional electrode 13 does not function (i.e., does not perform heating, and the multi-functional electrode 13 can be considered as a heating electrode, not in use). This way, the droplet(s) in the microfluidic chip 2 can be heated to the required temperature during the time interval T8.

Applying Sample Operation and Magnetic Field to Droplet(s) Together

It is assumed that the control apparatus 3 already knows the size and the location of the droplet(s) (e.g., the control apparatus 3 has positioned the droplet(s) in the microfluidic chip 2 in the time intervals T1, T2). The control apparatus 3 can control the microfluidic chip 2 to apply sample operation (s) and apply magnetic field(s) to one or more droplets in the microfluidic chip 2 together. Please refer to the exemplary timing diagram shown in FIG. 5 for the following descriptions.

The control apparatus 3 generates a plurality of sample operation configurations according to a sample operation requirement and the size and the location of at least one droplet in the microfluidic chip 2 as described in the section “Applying sample operation(s).” In addition, the control apparatus 3 generates a plurality of a plurality of magnetic field control configurations according to a magnetic field requirement and the size and the location of at least one droplet in the microfluidic chip 2 as described in the section “Applying magnetic field to droplet(s).”

Figure 5:
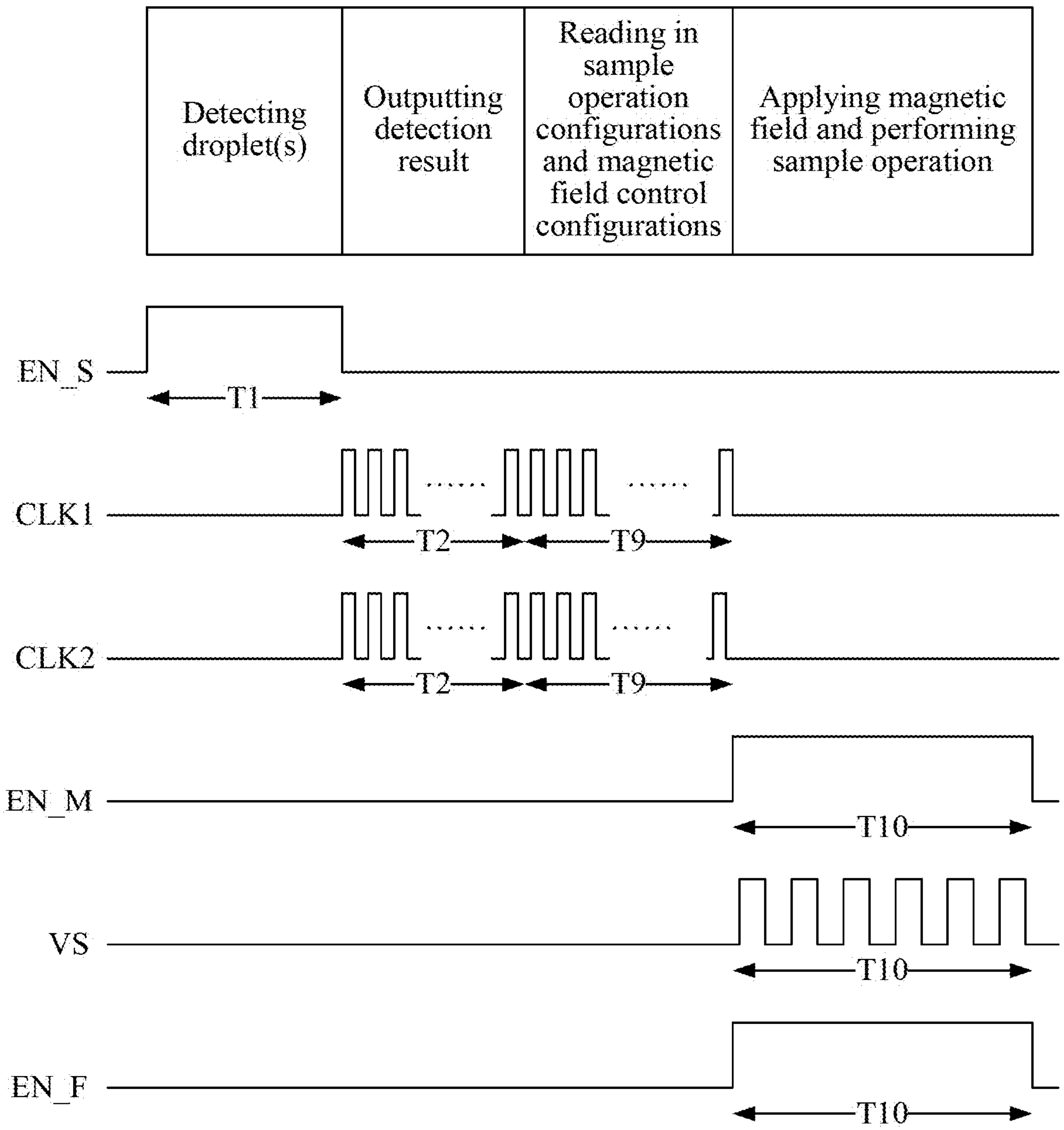
FIG. 5 illustrates an exemplary timing diagram for applying sample operation and magnetic field to droplet(s) together.

The control apparatus 3 provides the sample operation configurations S2 and the magnetic field control configurations S3 to the microfluidic chip 2 via the transmission interface 33. As shown in FIG. 5, both the clock signal CLK1 and the clock signal CLK2 are enabled within a plurality of sub-time intervals of the time interval T9 (e.g., the voltage level of the clock signal CLK1 and the voltage level of the clock signal CLK2 can be high within the sub-time intervals of the time interval T9). The time interval T9 is after the time interval T2. The sub-time intervals of the time interval T9 correspond to the storage circuits 155 of the microelectrode devices 1 one-to-one and correspond to the storage circuits 157 of the microelectrode devices 1 one-to-one. As the clock signal CLK1 is enabled within the sub-time intervals of the time interval T9 and the sub-time intervals of the time interval T9 correspond to the storage circuits 155 one-to-one, the storage circuits 155 read in the sample operation configurations S2 during the sub-time intervals of the time interval T9 respectively. Likewise, as the clock signal CLK2 is enabled within the sub-time intervals of the time interval T9 and the sub-time intervals of the time interval T9 correspond to the storage circuits 157 one-to-one, the storage circuits 157 read in the magnetic field control configurations S3 during the sub-time intervals of the time interval T9 respectively.

In the time interval T10 (a time interval after the time interval T9), the sample control signal EN_F is enabled, the magnetic field control signal EN_M is enabled, and the voltage level of the voltage signal VS provided to the top of the top plate 10 is high. Since the sample control signal EN_F is enabled and the voltage level of the voltage signal VS is high during the time interval T10, the microfluidic control and location-sensing circuit 155 of each microelectrode device 1 enters a sample control status according to the corresponding sample operation configuration during the time interval T10. In addition, since the magnetic field control signal EN_M is enabled within the time interval T10, the temperature and magnetic control circuit 153 of each microelectrode device 1 enters a magnetic control status according to the corresponding magnetic field control configuration during the time interval T10. This way, both the required sample operation and the required magnetic field can be applied to the droplet(s) within the time interval T10.

Target Extraction by the Microfluidic Processing System

As mentioned above, the operations that can be performed by the microfluidic processing system 100 (include positioning one or more droplets accurately, applying sample operation(s) to one or more droplets, applying a magnetic field to one or more droplets, heating one or more droplets, etc.) can be arranged in different ways to perform different biomedical processes.

In some embodiments, by arranging sample operation requirements and magnetic field requirements properly, the microfluidic processing system 100 can perform certain operations to achieve the target (e.g., nucleic acids) extraction. A specific example is given below with reference to FIG. 6A to FIG. 6F, which, however is not intended to limit the scope of the present invention.

In this specific example, the microelectrode devices 1 are divided into six groups so that the microfluidic chip 2 is divided into six regions G1, G2, G3, G4, G5, G6. Furthermore, the target extraction comprises six stages, including an initiation stage, a lysing stage, a binding stage, a washing stage, an elution stage, and a take-out stage.

Figure 6A:
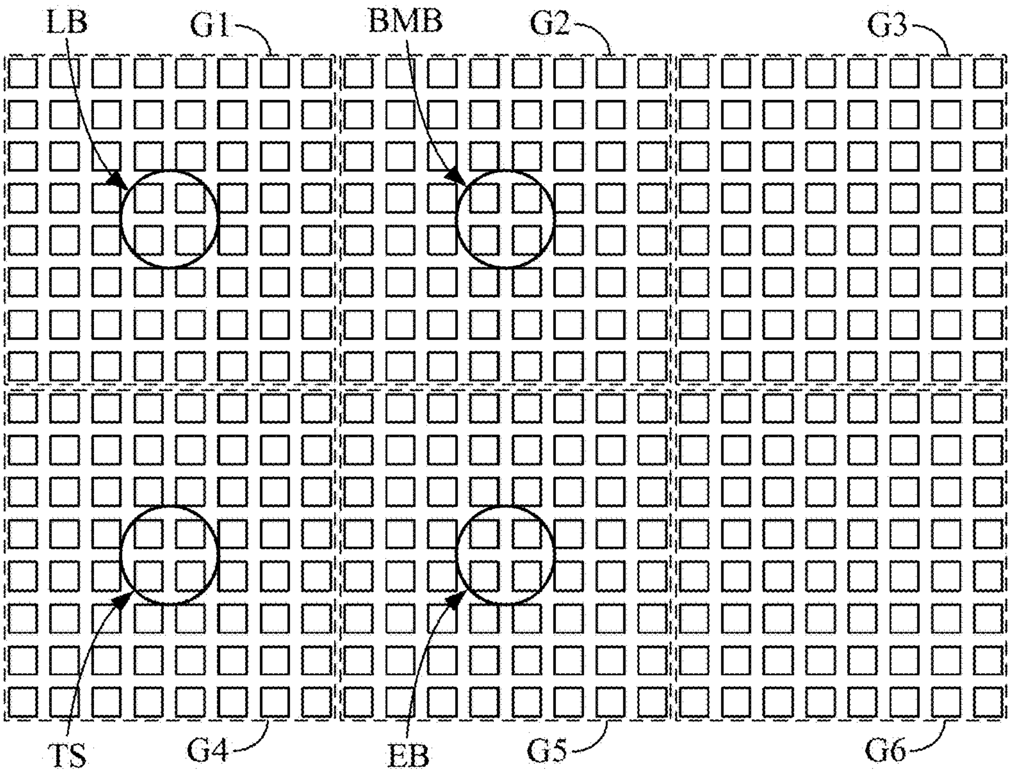
FIG. 6A to FIG. 6F illustrate the droplets in the microfluidic chip 2 after performing different stages of the DNA extraction.

In the initiation stage, the objective is to place the required droplets in the microfluidic chip 2. Specifically, there is a sample operation requirement for moving a test sample TS to the center of the region G4, moving a lysing buffer LB to the center of the region G1, moving a binding buffer with magnetic beads BMB to the center of the region G1, and moving an elution buffer EB to the center of the region G5. Please note that each of the test sample TS, the lysing buffer LB, the binding buffer with magnetic beads BMB, and the elution buffer EB is a droplet. The control apparatus 3 generates a plurality of sample operation configurations according to the aforesaid sample operation requirement and transmits the sample operation configurations to the microfluidic chip 2. The storage circuits 155 read in the sample operation configurations respectively and then the microfluidic control and location-sensing circuit 151 of each microelectrode device 1 enters a sample control status according to the corresponding sample operation configuration. Based on the descriptions in the section "Applying sample operation(s)," a person having ordinary skill in the art shall understand the operations performed by the microfluidic processing system 100 to accomplish the initiation stage. After the initiation stage, the size and the location of the test sample TS, the lysing buffer LB, the binding buffer with magnetic beads BMB, and the elution buffer EB are as shown in FIG. 6A.

Figure 6B:
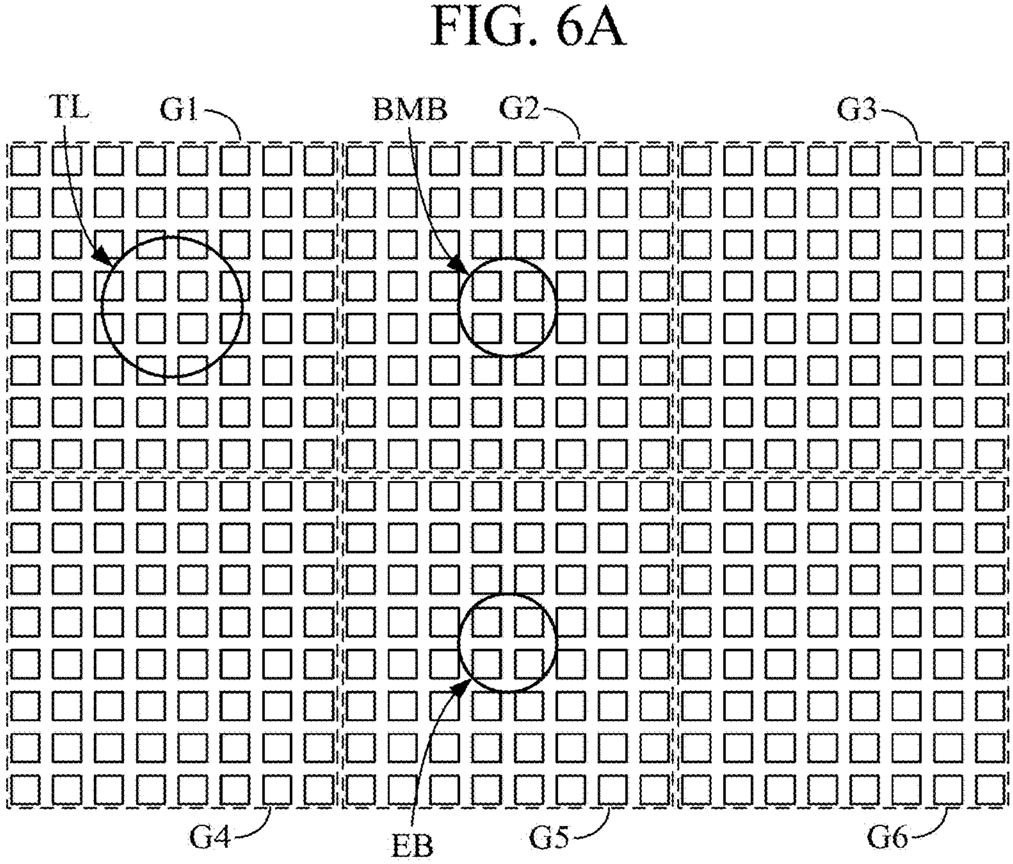

In the lysing stage, the objective is to break the cells in the test sample TS so that the desired target is exposed and/or floating. Specifically, there is a sample operation requirement for moving the test sample TS to the center of the region G1 to mix the test sample TS and the lysing buffer LB. The control apparatus 3 generates a plurality of sample operation configurations according to this sample operation requirement, the size and the location of the test sample TS, and the size and the location of the lysing buffer LB and transmits the sample operation configurations to the microfluidic chip 2. The storage circuits 155 read in the sample operation configurations respectively and then the microfluidic control and location-sensing circuit 151 of each microelectrode device 1 enters a sample control status according to the corresponding sample operation configuration. Based on the descriptions in the section "Applying sample operation(s)," a person having ordinary skill in the art shall understand the operations performed by the microfluidic processing system 100 to accomplish the lysing stage. After the lysing stage, the test sample TS and the lysing buffer LB are mixed as a mixed buffer TL as shown in FIG. 6B. In the mixed buffer TL, the desired target is exposed and/or floating. Please note that the mixed buffer TL is considered as a droplet.

Figure 6C:
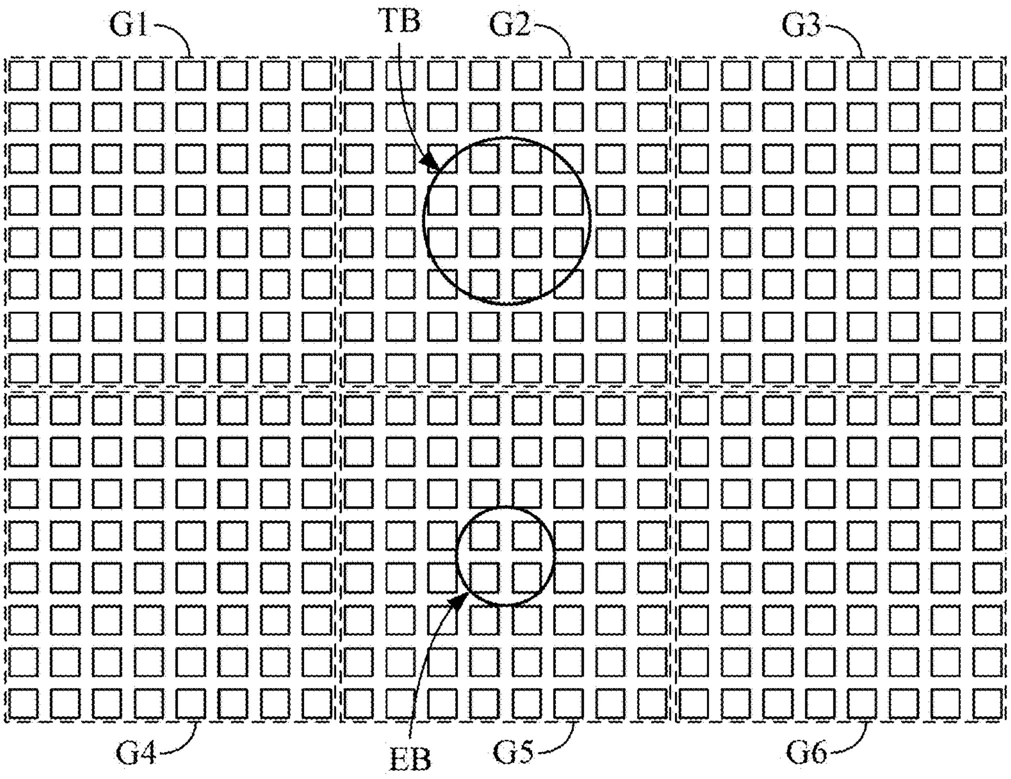

In the binding stage, the objective is to capture the desired target(s) by the magnetic beads, wherein the surface of every magnetic bead is coated with a certain material(s) for capturing the desired target(s)). Specifically, there is a sample operation requirement for moving the mixed buffer TL to the center of the region G2 to mix the mixed buffer TL with the binding buffer with magnetic beads BMB. The control apparatus 3 generates a plurality of sample operation configurations according to this sample operation requirement, the size and the location of the mixed buffer TL, and the size and the location of the binding buffer with magnetic beads BMB. The control apparatus 3 transmits the sample operation configurations to the microfluidic chip 2. The storage circuits 155 read in the sample operation configurations respectively and then the microfluidic control and location-sensing circuit 151 of each microelectrode device 1 enters a sample control status according to the corresponding sample operation configuration. Based on the descriptions in the section "Applying sample operation(s)," a person having ordinary skill in the art shall understand the operations performed by the microfluidic processing system 100 to accomplish the binding stage. After the binding stage, the test sample TS and the lysing buffer LB are mixed as a mixed buffer TB as shown in FIG. 6C. In the mixed buffer TB, the desired target(s) is/are captured by the magnetic beads. Please note that the mixed buffer TB is considered as a droplet.

Figure 6D:
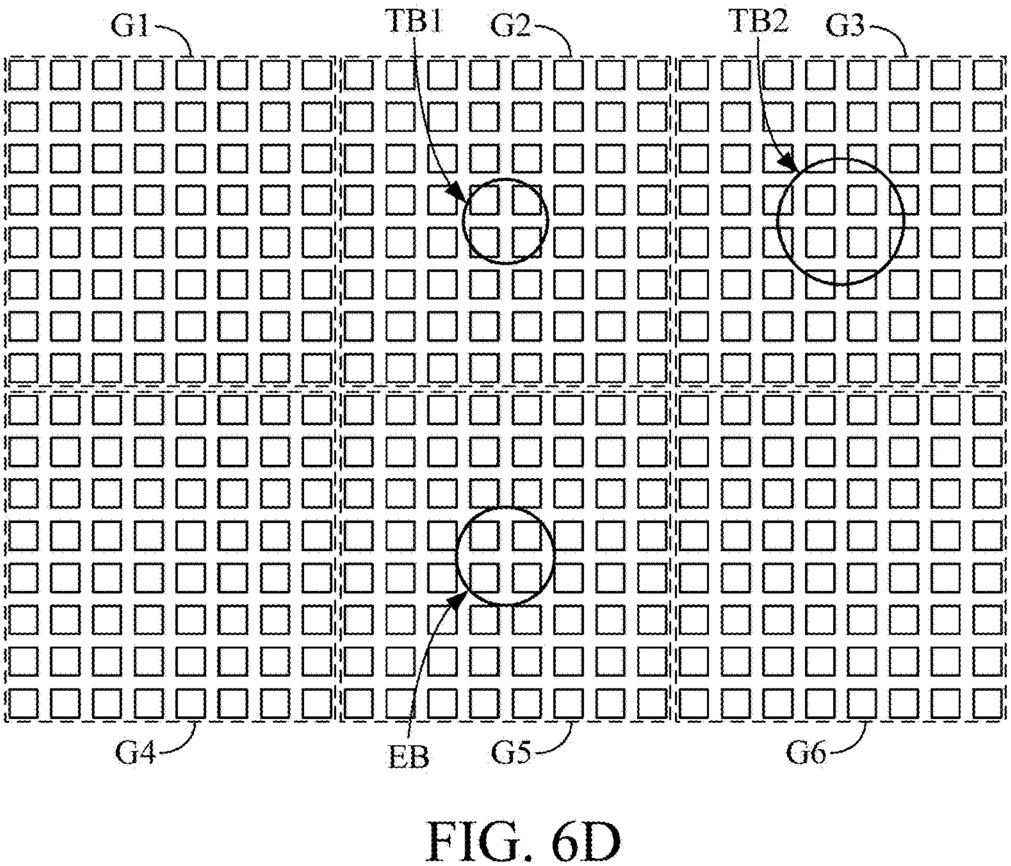

In the washing stage, the objective is to immobilize the magnetic beads and wash out the undesired portion. Specifically, there is a magnetic field requirement for attracting the magnetic beads within the mixed buffer TB to stay within the center of the region G2 (i.e., a first area within the space SP) and a sample operation requirement for moving a portion of the mixed buffer TB to the center of the region G3 (i.e., a second area within the space SP). The control apparatus 3 generates a plurality of magnetic field control configurations according to this magnetic field requirement and the size and the location of the mixed buffer TB. In addition, the control apparatus 3 generates a plurality of sample operation configurations according to this sample operation requirement and the center of the region G3. The control apparatus 3 transmits the magnetic field control configurations and the sample operation configurations to the microfluidic chip 2. Then, the temperature and magnetic control circuit 153 of each microelectrode device 1 enters a magnetic control status according to the corresponding magnetic field control configuration. In the meantime, the microfluidic control and location-sensing circuit 151 of each microelectrode device 1 enters a sample control status according to the corresponding sample operation configuration. Based on the descriptions in the section "Applying sample operation(s)" and the section "Applying magnetic field to droplet(s)," a person having ordinary skill in the art shall understand the operations performed by the microfluidic processing system 100 to accomplish the washing stage. After the washing stage, a droplet TB1 (i.e., the magnetic beads and a very tiny portion of the mixed buffer TB) stays within the center of the region G2 and another droplet TB2 (i.e., the undesired portion of the mixed buffer TB) is moved to the center of the region G3 as shown in FIG. 6D. In some embodiments, the droplet TB2 may be removed from the microfluidic chip 2.

Figure 6E:
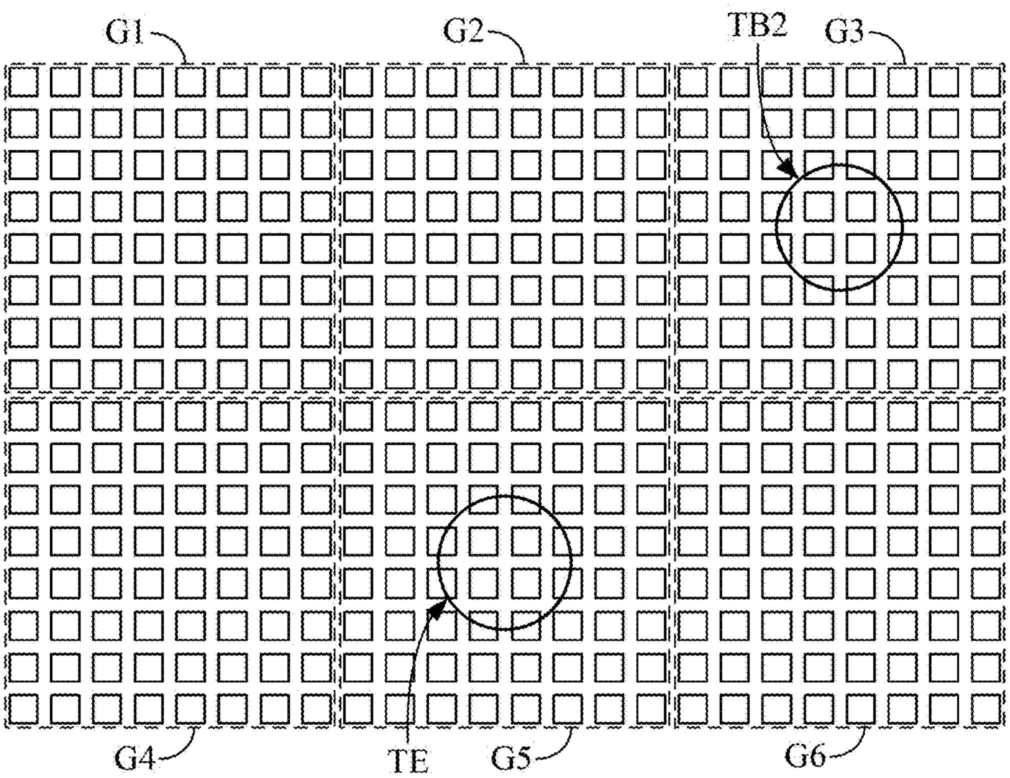

In the elution stage, the objective is to separate the magnetic beads from the desired target(s). Specifically, there is a sample operation requirement for mixing the droplet TB1 with the elution buffer EB (e.g., moving the droplet TB1 to the center of the region G5) and a magnetic field requirement for attracting the magnetic beads. The control apparatus 3 generates a plurality of sample operation configurations according to this sample operation requirement, the size and the location of the droplet TB1, and the size and the location of the elution buffer EB. In addition, the control apparatus 3 generates a plurality of magnetic field control configurations according to this magnetic field requirement and the size and the location of the elution buffer EB. The control apparatus 3 transmits the magnetic field control configurations and the sample operation configurations to the microfluidic chip 2. Then, the microfluidic control and location-sensing circuit 151 of each microelectrode device 1 enters a sample control status according to the corresponding sample operation configuration. In the meantime, the temperature and magnetic control circuit 153 of each microelectrode device 1 enters a magnetic control status according to the corresponding magnetic field control configuration. Based on the descriptions in the section "Applying sample operation(s)" and the section "Applying magnetic field to droplet(s)," a person having ordinary skill in the art shall understand the operations performed by the microfluidic processing system 100 to accomplish the elution stage. After the elution stage, the droplet TB1 and the elution buffer EB are mixed as another droplet TE as shown in FIG. 6E. In the droplet TE, the desired target(s) are separated from the magnetic beads.

Figure 6F:
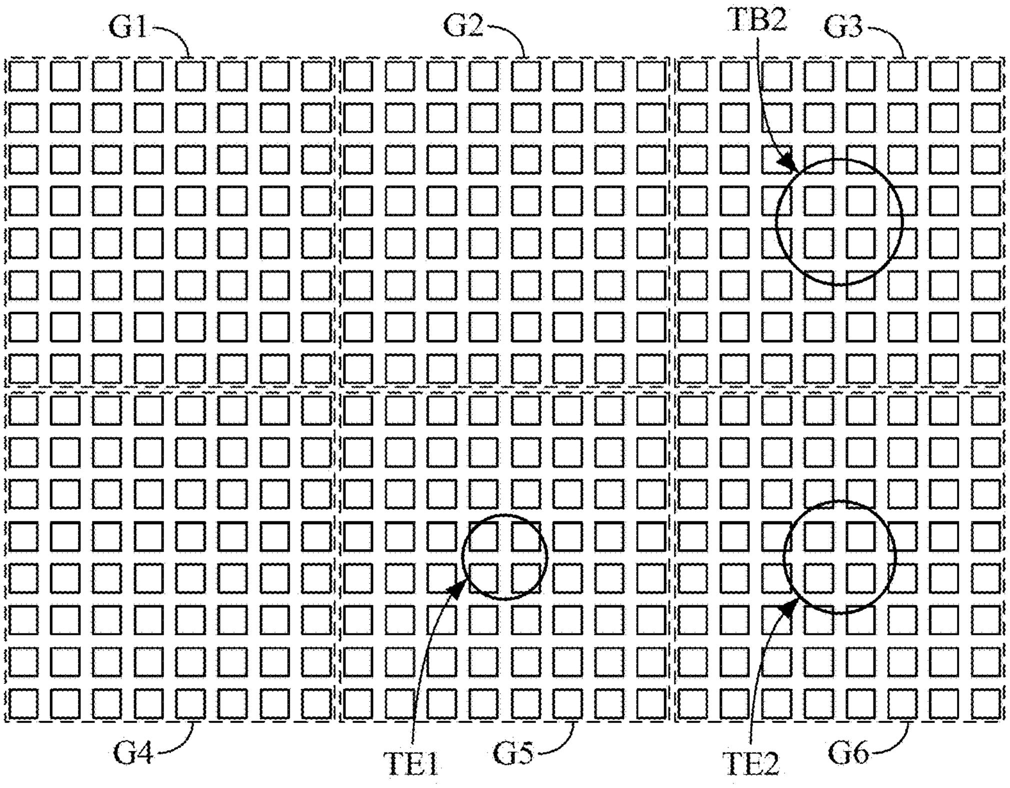

In the take-out stage, the objective is to take out the desired target(s) from the droplet TE. Specifically, there is a magnetic field requirement for attracting the magnetic beads within the droplet TE to stay within the center of the region G5 (i.e., a third area within the space SP) and a sample operation requirement for moving a portion of the droplet TE to the center of the region G6 (i.e., a fourth area within the space SP). The control apparatus 3 generates a plurality of magnetic field control configurations according to this magnetic field requirement and the size and the location of the droplet TE. In addition, the control apparatus 3 generates a plurality of sample operation configurations according to this sample operation requirement, the size and the location of the droplet TE, and the center of the region G6. The control apparatus 3 transmits the magnetic field control configurations and the sample operation configurations to the microfluidic chip 2. Then, the temperature and magnetic control circuit 153 of each microelectrode device 1 enters a magnetic control status according to the corresponding magnetic field control configuration. In the meantime, the microfluidic control and location-sensing circuit 151 of each microelectrode device 1 enters a sample control status according to the corresponding sample operation configuration. Based on the descriptions in the section "Applying sample operation(s)" and the section "Applying magnetic field to droplet(s)," a person having ordinary skill in the art shall understand the operations performed by the microfluidic processing system 100 to accomplish the take-out stage. After the take-out stage, a droplet TE1 (i.e., the magnetic beads and only a very tiny portion of the droplet TE) stays within the center of the region G5 and another droplet TE2 (i.e., the portion with the desired target(s)) is moved to the center of the region G6 as shown in FIG. 6F.

In some other embodiments, the microfluidic processing system 100 can position droplet(s) in the microfluidic chip 2 before every stage of the target extraction to achieve a more accurate result. A person having ordinary skill in the art shall understand how to achieve that based on the descriptions in the section "Positioning droplet(s)." Hence, the details are not repeated herein.

In some other embodiments, the microfluidic processing system 100 can further perform other biomedical test(s) to the droplet TE2. For example, the microfluidic processing system 100 may heat the droplet TE2 to certain degrees Celsius based on a temperature requirement. A person having ordinary skill in the art shall understand how to achieve that based on the descriptions in the section "Heating droplet(s)."

Bio-Protocols

In some embodiments, the storage device 31 may store a plurality of protocols Pa, Pb . . . , Pc. Each of the protocols Pa, Pb, . . . , Pc corresponds to a biomedical process (e.g., target extraction, biomedical test). As every biomedical process being executed has to follow the corresponding protocol to achieve an accurate result, a protocol of a biomedical process can be called a bio-protocol. Specifically, a protocol of a biomedical process may comprise a sample volume of a sample, at least one temperature requirement (e.g., reaching a certain degree of temperature), at least one sample operation requirement (e.g., moving, classifying, cutting, mixing sample(s) for testing), at least one magnetic field requirement (e.g., the intensity of magnetic field), and/or other requirements that a biomedical test has to follow.

For example, if the protocol Pa is for Polymerase Chain Reaction (PCR) test of a certain disease, the protocol Pa may comprise a sample volume of a test sample, a temperature requirement and a corresponding time interval for the Deoxyribonucleic Acid (DNA) denaturation stage, a temperature requirement and a corresponding time interval for the annealing stage, and a temperature requirement and a corresponding time interval for the extension stage.

As another example, if the test protocol Pc is for target (e.g., nucleic acids) extraction, the test protocol Pc may comprise the sample operation requirements and the magnetic field requirements in the initiation stage, the lysing stage, the binding stage, the washing stage, the elution stage, and the take-out stage as described in the section "Target extraction by the microfluidic processing system."

According to the present invention, there is no restriction on the number of protocols stored in the storage device 31 of the control apparatus 3. It is appreciated that the more protocols stored in the storage device 31 of the control apparatus 3, the more biomedical processes can be performed by the microfluidic test system 100.

Exemplary Circuit of the Control Circuit

Figure 7:
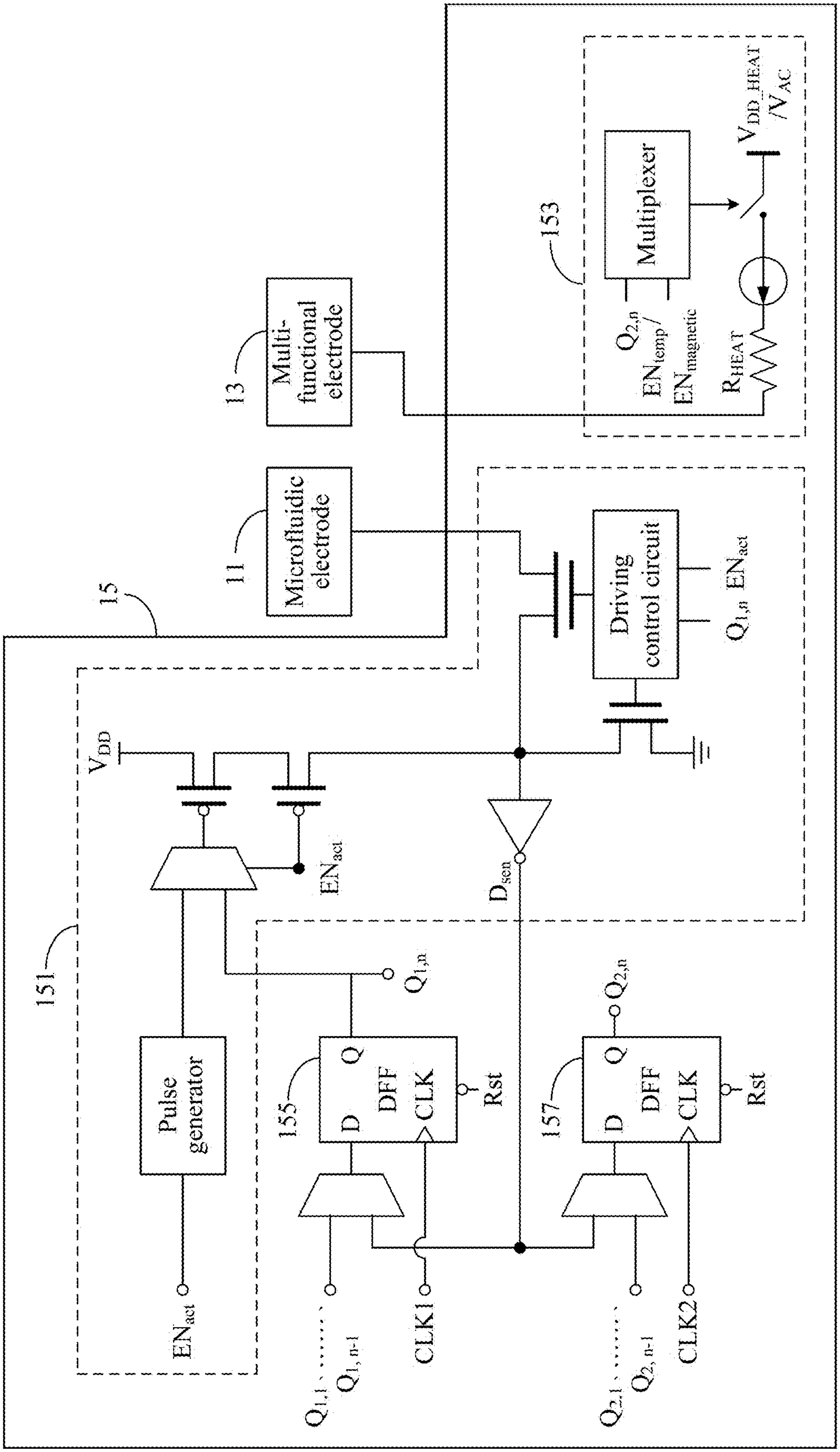
FIG. 7 illustrates an exemplary circuit diagram of the control circuit in a specific example.

Regarding the control circuit 15 of the microelectrode device 1 of the present invention, an exemplary circuit diagram is shown in FIG. 7. Please note that the circuit diagram shown in FIG. 7 is not intended to limit the scope of the present invention.

In this specific example, if it is going to perform a sample operation requirement specified in a protocol, the value of the control signal $EN_{act}$ is 0 (equivalent to the sample control signal EN_F being enabled), the value of the data signal $Q_n$ is the sample operation configuration read in by the microelectrode device 1, and the clock rate (e.g., can be set to 1K-10K Hz) of the clock signal CLK1 can be slower than the clock rate set for other operations. The microfluidic control and location-sensing circuits 151 will generate a pulling force to accomplish the sample operation on the droplet LO.

In this specific example, if it is going to detect the capacitance value between the top plate 10 and the microfluidic electrode 11, the value of the control signal $EN_{act}$ is 1 (equivalent to the location-sensing signal EN_S being enabled), and the clock rate (e.g., can be set to 1M-10M Hz) of the clock signal CLK1 can be faster than the clock rate set for sample operations. The microfluidic control and location-sensing circuits 151 will output the detected capacitance value (i.e., the result of discharging the capacitance) as the detected result $D_{sen}$ and store the detected result $D_{sen}$ in the storage circuit 155 (can be a D flip-flop) as the data signal $D_n$. As described above, the microelectrode devices 1 comprised in the microelectrode dot array 21 are connected in a series and, hence, the storage circuit 155 will receive the data signals $Q_{1,1}, \ldots, Q_{1,n-1}$ of the storage circuits 155 of other microelectrode devices 1 arranged ahead and then output them.

In this specific example, if it is going to perform a temperature requirement specified in a protocol, the value of the control signal $EN_{temp}/EN_{magnetic}$ is 1 (equivalent to the heating control signal EN_T being enabled), and the value of the data signal $Q_{2,n}$ is the heating control configuration (e.g., the numerical value "0" represents not performing heating and the numerical value "1" represents performing heating) read in by the microelectrode device 1. The multiplexer in the temperature and magnetic control circuit 153 will determine whether to conduct the switch therein and supply direct voltage $V_{DD\_HEAT}$ according to the heating control signal EN_T and the data signal $Q_{2,n}$. If the switch in the temperature, and magnetic control circuit 153 is conducted, the direct voltage $V_{DD\_HEAT}$ will be provided to the temperature and magnetic control circuit 153 and the current will pass the resistor $R_{HEAT}$ and the multi-functional electrode 13 and thereby achieve the result of heating up.

In this specific example, if it is going to perform a magnetic field requirement specified in a protocol, the value of the control signal $EN_{temp}/EN_{magnetic}$ is 1 (equivalent to the magnetic control signal EN_M being enabled), and the value of the data signal $Q_{2,n}$ is the magnetic field control configuration (e.g., the numerical value "0" represents not providing magnetic field and the numerical value "1" represents providing magnetic field) read in by the microelectrode device 1. The multiplexer in the temperature and magnetic control circuit 153 will determine whether to conduct the switch therein and supply alternating voltage $V_{AC}$ according to the magnetic control signal EN_M and the data signal $Q_{2,n}$. If the switch in the temperature and magnetic control circuit 153 is conducted and the alternating voltage $V_{AC}$ is provided to the temperature and magnetic control circuit 153, a magnetic field will be formed.

Microfluidic Processing Methods

The present invention also provides microfluidic processing methods for use in a control apparatus (e.g., the control apparatus 3 described in the above embodiments) of a microfluidic processing system to control the microfluidic chip 2.

Figure 8:
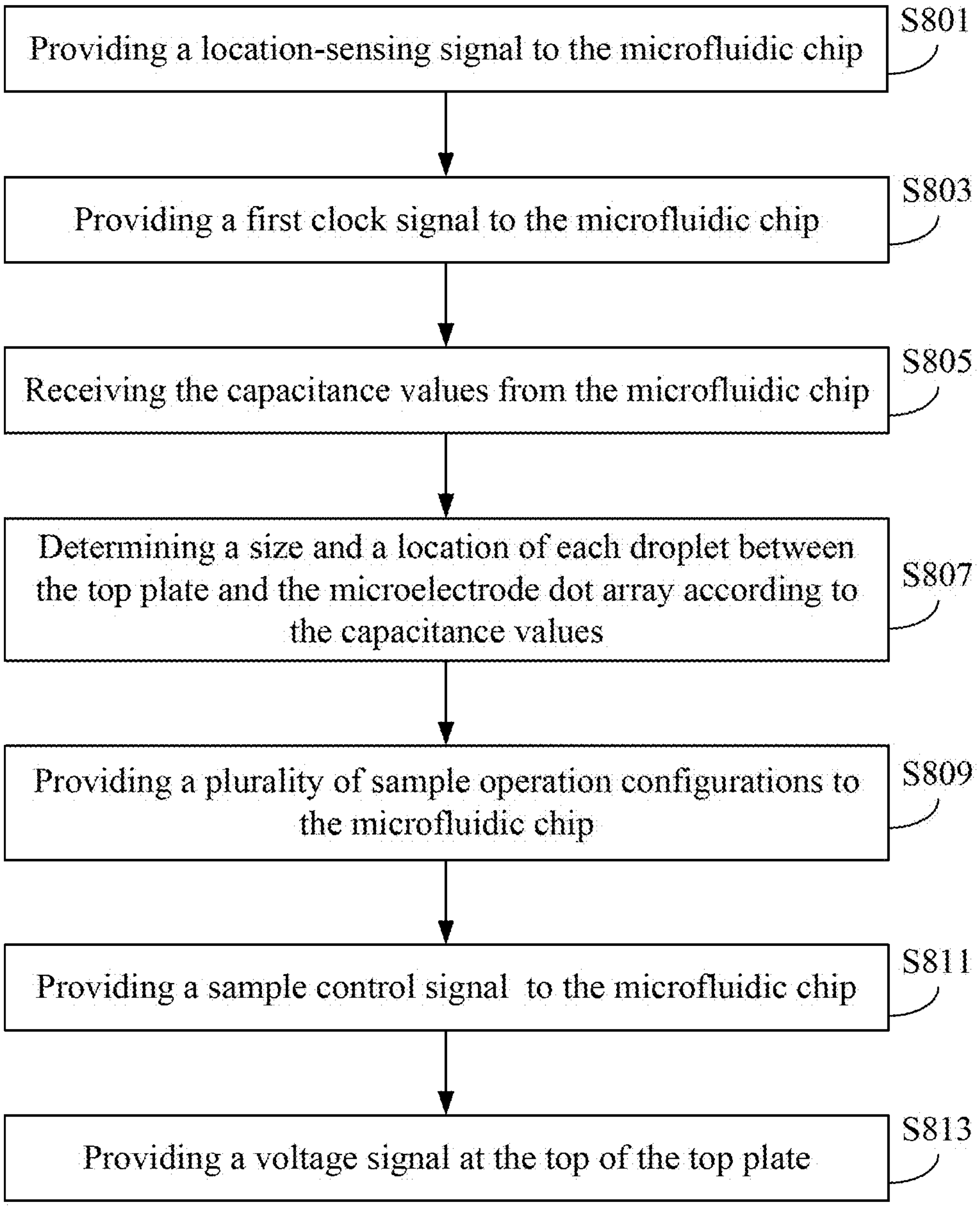
FIG. 8 illustrates the main flowchart of the microfluidic processing method in some embodiments of the present invention.

FIG. 8 illustrates the main flowchart of the microfluidic processing method in some embodiments of the present invention. In those embodiments, the microfluidic processing method comprises the steps S801 to S807 for positioning droplet(s) in the microfluidic chip 2 and the steps S809 to S813 for applying sample operation to the droplet(s).

Step S801 is executed for providing the location-sensing signal EN_S to the microfluidic chip 2. The location-sensing signal EN_S is enabled within the time interval T1 so that each of the microfluidic control and location-sensing circuits 151 detects a capacitance value between the top plate 10 and the corresponding microfluidic electrode 11 and stores the capacitance value in the corresponding storage circuit 155 during the time interval T1 according to the location-sensing signal.

Step S803 is executed for providing the clock signal CLK1 (a first clock signal) to the microfluidic chip 2. The clock signal CLK1 is enabled within a plurality of sub-time intervals of the time interval T2 so that each storage circuit 155 outputs the corresponding capacitance value during the corresponding sub-time interval of the time interval T2.

Step S805 is executed for receiving the capacitance values from the microfluidic chip 2. Step S807 is executed for determining a size and a location of each droplet between the top plate 10 and the microelectrode dot array 21 according to the capacitance values. In some embodiments, it is possible that the control apparatus has known the size and the location of the droplet(s) that is/are going to be processed. For those embodiments, steps S801, S805, and S807 will be omitted, and the clock signal CLK1 will not be enabled within the sub-time intervals of the time interval T2.

Step S809 is executed for providing a plurality of sample operation configurations to the microfluidic chip 2. Specifically, the clock signal CLK1 is enabled within a plurality of sub-time intervals of the time interval T3 so that each storage circuit 155 reads in the corresponding sample operation configuration within the corresponding sub-time interval. In some embodiments, the microfluidic processing method executes another step before step S809 for generating the sample operation configurations according to a sample operation requirement and the size and the location of the droplet(s) to be processed.

Step S811 is executed for providing a sample control signal EN_F to the microfluidic chip 2. Step S813 is executed for providing a voltage signal VS at the top of the top plate 10. During the time interval T4, the sample control signal EN_F is enabled, and the voltage level of the voltage signal VS is high so that each microfluidic control and location-sensing circuit 151 enters a sample control status according to the corresponding sample operation configuration during the time interval T4. This way, the sample operation is applied to the droplet(s).

Please note that the present invention does not restrict the order for executing steps S801, S803, S811, and S813. However, the time interval T2 is after the time interval T1, the time interval T3 is after the time interval T2, and the time interval T4 is after the time interval T3.

Figure 9:
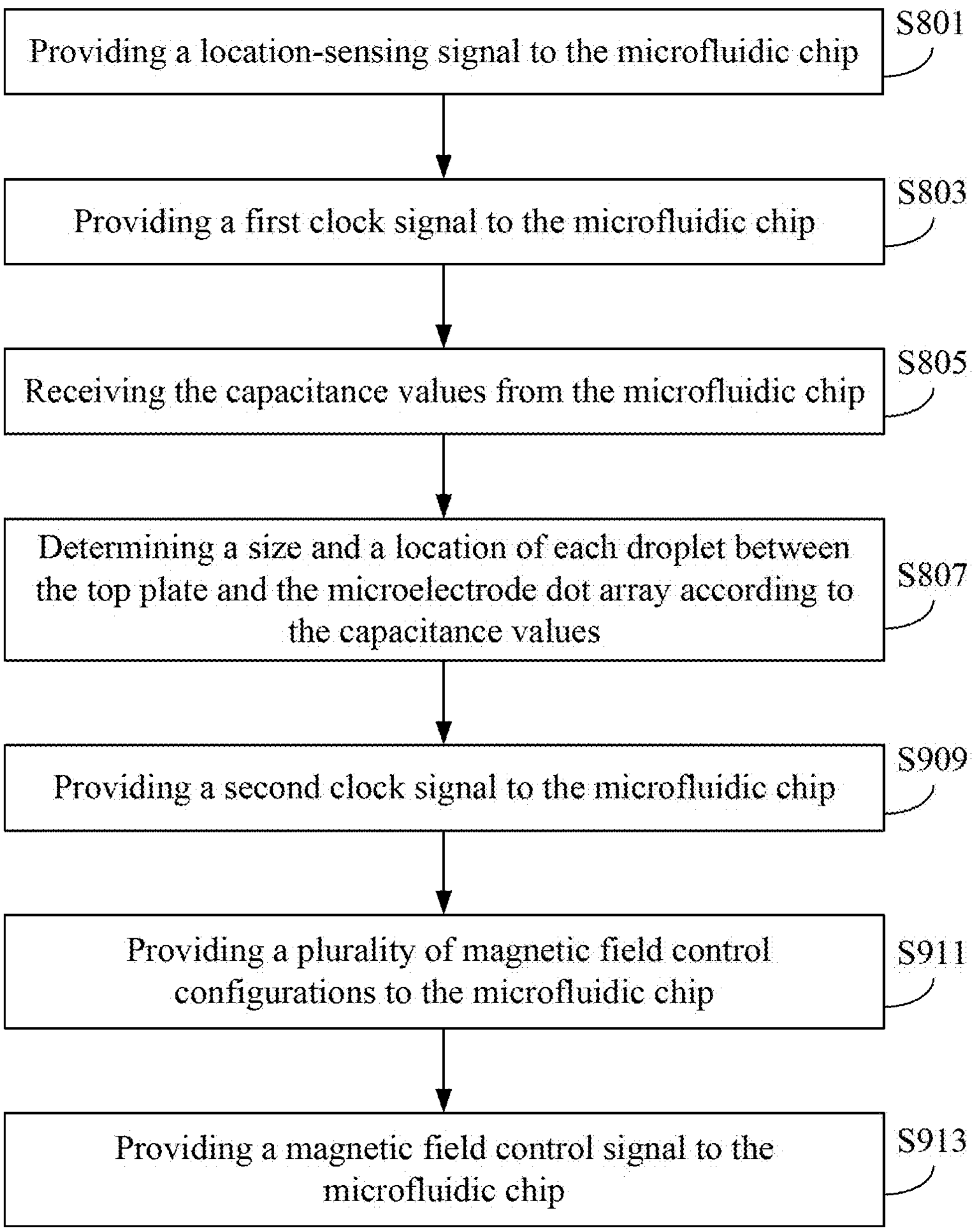
FIG. 9 illustrates the main flowchart of the microfluidic processing method in some embodiments of the present invention.

FIG. 9 illustrates the main flowchart of the microfluidic processing method in some embodiments of the present invention. In those embodiments, the microfluidic processing method comprises steps S801 to S807 for positioning droplet(s) in the microfluidic chip 2 and steps S909 to S913 for applying magnetic field to droplet(s). The details regarding step S801 to S807 have been described above and, hence, will not be repeated herein.

Step S909 is executed for providing the clock signal CLK2 (a second clock signal) to the microfluidic chip 2, wherein the clock signal CLK2 is enabled within a plurality of sub-time intervals of the time interval T5. Step S911 is executed for providing a plurality of magnetic field control configurations to the microfluidic chip 2. Each storage circuit 157 reads the corresponding magnetic field control configuration during the corresponding sub-time interval of the time interval T5. Step S913 is executed for providing a magnetic field control signal EN_M to the microfluidic chip 2. The magnetic field control signal EN_M is enabled within the time interval T6 so that each temperature and magnetic control circuit 153 enters a magnetic control status according to the corresponding magnetic field control configuration during the time interval T6. This way, the magnetic field is applied to the droplet(s).

Please note that the present invention does not restrict the order for executing steps S801, S803, and S909. However, the time interval T2 is after the time interval T1, the time interval T5 is after the time interval T2, and the time interval T6 is after the time interval T5.

Figure 10:
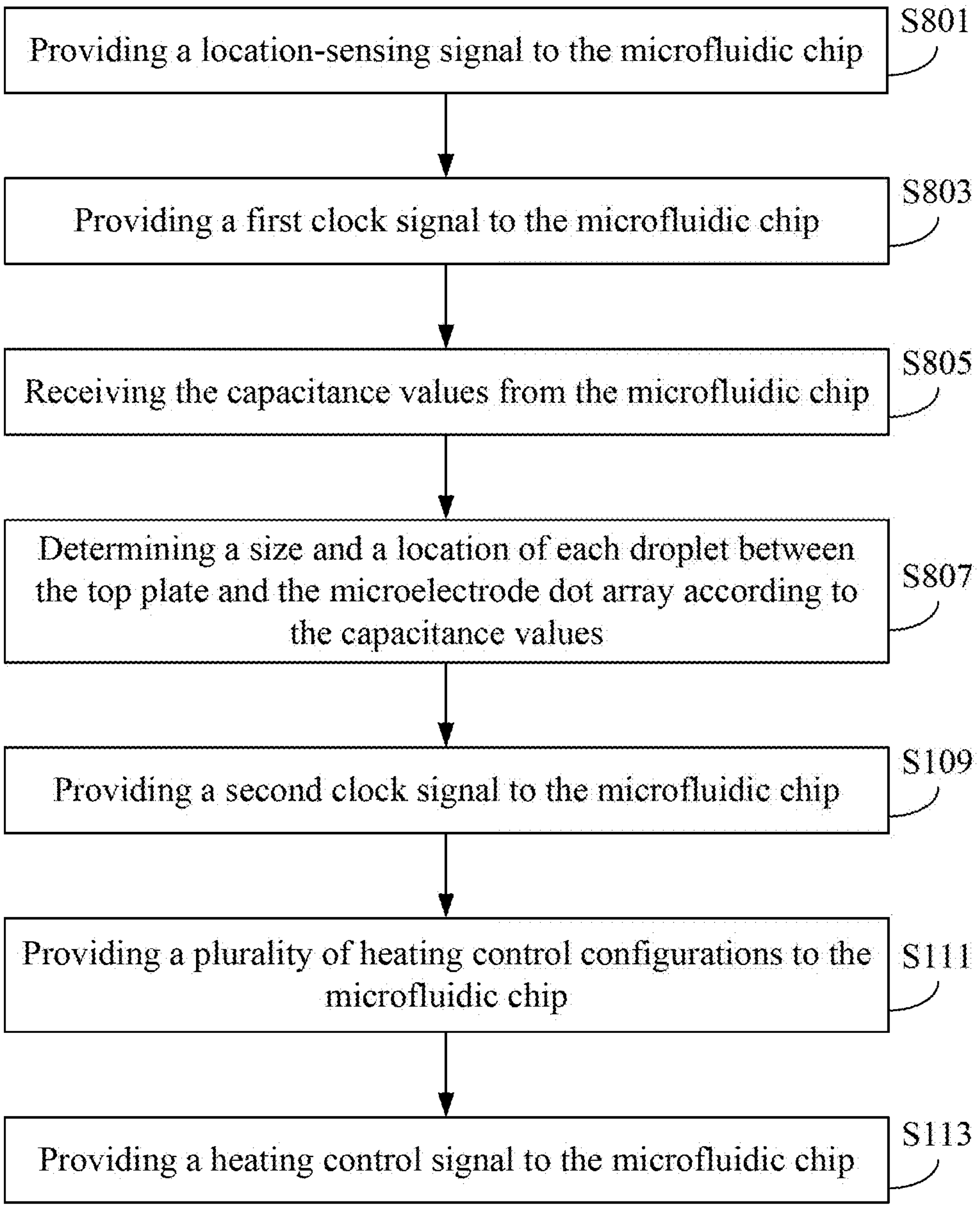
FIG. 10 illustrates the main flowchart of the microfluidic processing method in some embodiments of the present invention.

FIG. 10 illustrates the main flowchart of the microfluidic processing method in some embodiments of the present invention. In those embodiments, the microfluidic processing method comprises steps S801 to S807 for positioning droplet(s) in the microfluidic chip 2 and steps S109 to S113 for heating droplet(s). The details regarding step S801 to S807 have been described above and, hence, will not be repeated herein.

Step S109 is executed for providing the clock signal CLK2 (a second clock signal) to the microfluidic chip 2, wherein the clock signal CLK2 is enabled within a plurality of sub-time intervals of the time interval T7. Step S111 is executed for providing a plurality of heating control configurations to the microfluidic chip 2. Each storage circuit 157 reads the corresponding heating control configuration during the corresponding sub-time interval of the time interval T7. Step S113 is executed for providing a heating control signal EN_T to the microfluidic chip 2. The heating control signal EN_T is enabled within the time interval T8 so that each temperature and magnetic control circuit 153 enters a heating control status according to the corresponding heating control configuration during the time interval T8. In this way, the droplet(s) are heated.

Please note that the present invention does not restrict the order for executing steps S801, S803, and S109. However, the time interval T2 is after the time interval T1, the time interval T7 is after the time interval T2, and the time interval T8 is after the time interval T7.

The aforesaid steps for poisoning droplet(s), applying sample operation to droplet(s), applying a magnetic field to droplet(s), and heating droplet(s) can be performed individually or in combination. In some embodiments, the aforesaid steps can be arranged differently to perform different biomedical processes.

In addition to the previously mentioned steps, the microfluidic processing methods provided by the present invention can execute other steps so that the control apparatus 3 can control the microfluidic chip 2 to have the same functions and deliver the same technical effects as those described in the above various embodiments. How the microfluidic processing methods provided by the present invention execute those operations and steps, has the same functions, and deliver the same technical effects will be readily appreciated by a person having ordinary skill in the art based on the above explanation of the previously mentioned embodiments, and thus will not be further described herein.

It shall be appreciated that, in the specification and the claims of the present invention, some terms (including time interval, capacitance value, sampling time) are preceded by the terms "first," "second," . . . , or "eighth." Please note that the terms "first," "second," . . . , and "eighth" are used only for distinguishing different terms. If the order of these terms is not specified or the order of the terms cannot be derived from the context, the order of these terms is not limited by the preceded "first," "second," . . . , or "eighth."

According to the above descriptions, the microfluidic processing technique provided by the present invention can poison droplet(s), apply sample operation to droplet(s), apply a magnetic field to droplet(s), and heat droplet(s). With proper arrangement of the timing diagram, sample operation and magnetic field can be applied together (i.e., within the same time interval). Therefore, by arranging sample operation requirement(s), magnetic field requirement(s), and/or temperature requirement(s) properly and generating the required sample operation configurations, the required magnetic field control configurations and/or the required heating control configurations according to the latest size and location of the droplet(s) to be processed, various kinds of biomedical processes (e.g., target extractions, biomedical tests) can be performed accurately on the same equipment. Comparing to conventional technique, using the microfluidic processing technique provided by the present invention to perform biomedical processes is more convenient because all the operations can be performed on the same equipment. In addition, as all the operations can be performed on the same equipment, droplet will not be contaminated.

The above disclosure is related to the detailed technical contents and inventive features. A person having ordinary skill in the art may proceed with various modifications and replacements based on the disclosures and suggestions of the invention as described without departing from the characteristics thereof. Nevertheless, although such modifications and replacements are not fully 5 disclosed in the above descriptions, they have been substantially covered in the following claims as appended.

What is claimed is:

1. A microfluidic chip, comprising:
- a top plate; and
- a microelectrode dot array, being arranged under the top plate and comprising a plurality of microelectrode devices connected in a series, wherein each of the microelectrode devices comprises:
  - a microfluidic electrode, being arranged under the top plate;
  - a multi-functional electrode, being arranged under the microfluidic electrode; and
  - a control circuit, being arranged under the multi-functional electrode and comprising:
    - a first storage circuit, being configured to read in a sample operation configuration during a sub-time interval of a first time interval according to a first clock signal;
    - a second storage circuit, being configured to read in a magnetic field control configuration during a sub-time interval of a second time interval according to a second clock signal;
    - a microfluidic control and location-sensing circuit, being coupled to the microfluidic electrode and configured to enter a sample control status corresponding to the sample operation configuration during a third time interval according to a sample control signal; and
    - a temperature and magnetic control circuit, being coupled to the multi-functional electrode and configured to enter a magnetic control status corresponding to the magnetic field control configuration during a fourth time interval according to a magnetic field control signal.

2. The microfluidic chip of claim 1, wherein for each of the microelectrode devices,
- the second storage circuit is further configured to read in a heating control configuration during a sub-time interval of a fifth time interval according to the second clock signal, and the temperature and magnetic control circuit is configured to enter a heating control status corresponding to the heating control configuration during a sixth time interval according to a heating control signal.

3. The microfluidic chip of claim 1, wherein each of the microelectrode devices has an input terminal and an output terminal, wherein for each of the microelectrode devices except the first microelectrode device, the input terminal is coupled to the output terminal of the previous microelectrode device, wherein for each of the microelectrode devices, the microfluidic control and location-sensing circuit is further configured to detect a capacitance value between the top plate and the microfluidic electrode and store the capacitance value in the first storage circuit during a seventh time interval according to a location-sensing signal, and the first storage circuit is further configured to output the capacitance value during a sub-time interval of an eighth time interval according to the first clock signal.

4. The microfluidic chip of claim 1, wherein a droplet is within a space between the top plate and the microelectrode dot array, the droplet is a buffer comprising a plurality of magnetic beads, wherein the magnetic field control configurations are used for attracting the magnetic beads to stay within a first area within the space, and the sample operation configurations are used for moving a portion of the buffer to a second area within the space.

5. The microfluidic chip of claim 1, wherein a first droplet and a second droplet are within a space between the top plate and the microelectrode dot array, the first droplet is a first buffer comprising a plurality of magnetic beads and the second droplet is a second buffer, wherein the sample operation configurations are used for mixing the first droplet and the second droplet, and the magnetic field control configurations are used for attracting the magnetic beads.

6. A microfluidic processing system, comprising:

a control apparatus; and a microfluidic chip, comprising:

a top plate; and a microelectrode dot array, being arranged under the top plate and comprising a plurality of microelectrode devices connected in a series, wherein each of the microelectrode devices comprises:

a microfluidic electrode, being arranged under the top plate;

a multi-functional electrode, being arranged under the microfluidic electrode; and a control circuit, being arranged under the multi-functional electrode and comprising a first storage circuit, a second storage circuit, a microfluidic control and location-sensing circuit coupled to the microfluidic electrode, and a temperature and magnetic control circuit coupled to the multi-functional electrode, wherein the control apparatus is configured to provide a first clock signal, a second clock signal, a plurality of sample operation configurations, a plurality of magnetic field control configurations, a sample control signal, and a magnetic field control signal, wherein each of the first storage circuits is configured to read in one of the sample operation configurations during a sub-time interval of a first time interval according to the first clock signal, wherein each of the second storage circuits is configured to read in one of the magnetic field control configurations during a sub-time interval of a second time interval according to the second clock signal, wherein each of the microfluidic control and location-sensing circuits is configured to enter a sample control status corresponding to one of the sample operation configurations during a third time interval according to the sample control signal, and wherein each of the temperature and magnetic control circuits is configured to enter a magnetic control status corresponding to one of the magnetic field control configurations during a fourth time interval according to the magnetic field control signal.

7. The microfluidic processing system of claim 6, wherein the control apparatus is further configured to provide a plurality of heating control configurations and a heating control signal, wherein each of the second storage circuits is further configured to read in one of the heating control configurations during a sub-time interval of a fifth time interval according to the second clock signal, and wherein each of the temperature and magnetic control circuits is configured to enter a heating control status corresponding to one of the heating control configurations during a sixth time interval according to the heating control signal.

8. The microfluidic processing system of claim 6, wherein each of the microelectrode devices has an input terminal and an output terminal, wherein for each of the microelectrode devices except the first microelectrode device, the input terminal is coupled to the output terminal of the previous microelectrode device, wherein the control apparatus is further configured to provide a location-sensing signal, wherein each of the microfluidic control and location-sensing circuits is further configured to detect a capacitance value between the top plate and the corresponding microfluidic electrode and store the capacitance value in the corresponding first storage circuit during a seventh time interval according to the location-sensing signal, and wherein each of the first storage circuits is further configured to output the corresponding capacitance value during a sub-time interval of an eighth time interval according to the first clock signal.

9. The microfluidic processing system of claim 8, wherein the control apparatus is further configured to receive the capacitance values and determines a size and a location of each of at least one droplet between the top plate and the microelectrode dot array according to the capacitance values.

10. The microfluidic processing system of claim 9, wherein the control apparatus is further configured to generate the sample operation configurations according to a sample operation requirement, one of the at least one size, and one of the at least one location, and the control apparatus is further configured to generate the magnetic field control configurations according to a magnetic field requirement, one of the at least one size, and one of the at least one location.

11. The microfluidic processing system of claim 6, wherein the control apparatus is further configured to store a test protocol, and the sample operation configurations and the magnetic field control configurations are generated with reference to the test protocol.

12. The microfluidic processing system of claim 6, wherein a droplet is within a space between the top plate and the microelectrode dot array, the droplet is a buffer comprising a plurality of magnetic beads, wherein the magnetic field control configurations are used for attracting the magnetic beads and a first portion of the buffer to stay within a first area within the space, and the sample operation configurations are used for moving a second portion of the buffer to a second area within the space.

13. The microfluidic processing system of claim 6, wherein a first droplet and a second droplet are within a space between the top plate and the microelectrode dot array, the first droplet is a first buffer comprising a plurality of magnetic beads, and the second droplet is a second buffer, wherein the sample operation configurations are used for mixing the first droplet and the second droplet, and the magnetic field control configurations are used for attracting the magnetic beads.

14. A microfluidic processing method for use in a control apparatus of a microfluidic processing system to control a microfluidic chip, the microfluidic chip comprising a top plate and a microelectrode dot array, the microelectrode dot array being arranged under the top plate and comprising a plurality of microelectrode devices connected in a series, each of the microelectrode devices comprising a microfluidic electrode being arranged under the top plate, a multi-functional electrode being arranged under the microfluidic electrode, and a control circuit being arranged under the multi-functional electrode, each of the control circuits comprising a first storage circuit, a second storage circuit, a microfluidic control and location-sensing circuit coupled to the corresponding microfluidic electrode, and a temperature and magnetic control circuit coupled to the corresponding multi-functional electrode, the microfluidic processing method comprising the following steps:

providing a first clock signal to the microfluidic chip;

providing a second clock signal to the microfluidic chip;

providing a plurality of sample operation configurations to the microfluidic chip;

providing a plurality of magnetic field control configurations to the microfluidic chip;

providing a sample control signal to the microfluidic chip; and providing a magnetic field control signal to the microfluidic chip, wherein each of the first storage circuits is configured to read in one of the sample operation configurations during a sub-time interval of a first time interval according to the first clock signal, wherein each of the second storage circuits is configured to read in one of the magnetic field control configurations during a sub-time interval of a second time interval according to the second clock signal, wherein each of the microfluidic control and location-sensing circuits is configured to enter a sample control status corresponding to one of the sample operation configurations during a third time interval according to the sample control signal, and wherein each of the temperature and magnetic control circuits is configured to enter a magnetic control status corresponding to one of the magnetic field control configurations during a fourth time interval according to the magnetic field control signal.

15. The microfluidic processing method of claim 14, further comprising the following step:

providing a plurality of heating control configurations to the microfluidic chip;

providing a heating control signal to the microfluidic chip;

wherein each of the second storage circuits is further configured to read in one of the heating control configurations during a sub-time interval of a fifth time interval according to the second clock signal, and wherein each of the temperature and magnetic control circuits is configured to enter a heating control status corresponding to one of the heating control configurations during a sixth time interval according to the heating control signal.

16. The microfluidic processing method of claim 14, wherein each of the microelectrode devices has an input terminal and an output terminal, wherein for each of the microelectrode devices except the first microelectrode device, the input terminal is coupled to the output terminal of the previous microelectrode device, wherein the microfluidic processing method further comprises:

providing a location-sensing signal to the microfluidic chip, wherein each of the microfluidic control and location-sensing circuits is further configured to detect a capacitance value between the top plate and the corresponding microfluidic electrode and store the capacitance value in the corresponding first storage circuit during a seventh time interval according to the location-sensing signal, and wherein each of the first storage circuits is further configured to output the corresponding capacitance value during a sub-time interval of an eighth time interval according to the first clock signal.

17. The microfluidic processing method of claim 16, further comprising:

receiving the capacitance values from the microfluidic chip; and determining a size and a location of each of at least one droplet between the top plate and the microelectrode dot array according to the capacitance values.

18. The microfluidic processing method of claim 17, further comprising:

generating the sample operation configurations according to a sample operation requirement, one of the at least one size, and one of the at least one location; and generating the magnetic field control configurations according to a magnetic field requirement, one of the at least one size, and one of the at least one location.

19. The microfluidic processing method of claim 14, a droplet is within a space between the top plate and the microelectrode dot array, the droplet is a buffer comprising a plurality of magnetic beads, wherein the magnetic field control configurations are used for attracting the magnetic beads and a first portion of the buffer to stay within a first area within the space, and the sample operation configurations are used for moving a second portion of the buffer to a second area within the space.

20. The microfluidic processing method of claim 14, wherein a first droplet and a second droplet are within a space between the top plate and the microelectrode dot array, the first droplet is a first buffer comprising a plurality of magnetic beads and the second droplet is a second buffer, wherein the sample operation configurations are used for mixing the first droplet and the second droplet, and the magnetic field control configurations are used for attracting the magnetic beads.

* * * * *